US011567638B2

(12) United States Patent
Hwang et al.

(10) Patent No.: US 11,567,638 B2
(45) Date of Patent: Jan. 31, 2023

(54) METHOD, SYSTEM, AND NON-TRANSITORY COMPUTER-READABLE RECORD MEDIUM FOR PROVIDING REPUTATION BADGE FOR VIDEO CHAT

(71) Applicant: LINE Plus Corporation, Seongnam-si (KR)

(72) Inventors: Eunsun Hwang, Seongnam-si (KR); Jinhee Yoo, Seongnam-si (KR); Eun-Joon Lee, Seongnam-si (KR); Jeong Yub Lee, Seongnam-si (KR); Sojung Yang, Seongnam-si (KR); Seung Jun Park, Seongnam-si (KR); Grace Minjoo Chung, Seongnam-si (KR)

(73) Assignee: LINE Plus Corporation, Seongnam-si (KR)

( * ) Notice: Subject to any disclaimer, the term of this patent is extended or adjusted under 35 U.S.C. 154(b) by 130 days.

(21) Appl. No.: 17/103,134

(22) Filed: Nov. 24, 2020

(65) Prior Publication Data

US 2021/0157462 A1    May 27, 2021

(30) Foreign Application Priority Data

Nov. 25, 2019   (KR) .................. 10-2019-0151929

(51) Int. Cl.
| | | |
|---|---|---|
| G06F 3/04817 | (2022.01) | |
| G06F 3/0484 | (2022.01) | |
| H04N 7/14 | (2006.01) | |
| H04N 5/445 | (2011.01) | |
| G06F 3/0482 | (2013.01) | |

(52) U.S. Cl.
CPC .......... *G06F 3/0484* (2013.01); *G06F 3/0482* (2013.01); *G06F 3/04817* (2013.01); *H04N 5/445* (2013.01); *H04N 7/147* (2013.01)

(58) Field of Classification Search
CPC .. G06F 3/0484; G06F 3/04817; G06F 3/0482; H04N 5/445; H04N 7/147; H04N 21/4788; H04N 21/4312; G06Q 50/30
See application file for complete search history.

(56) References Cited

U.S. PATENT DOCUMENTS

| | | | |
|---|---|---|---|
| 10,567,450 B1* | 2/2020 | Gopal | H04N 21/4788 |
| 10,742,812 B1* | 8/2020 | Beavers | H04M 3/5183 |
| 2009/0192871 A1* | 7/2009 | Deacon | G06Q 10/00 705/14.1 |
| 2013/0212033 A1* | 8/2013 | Work | H04L 51/52 705/321 |
| 2018/0351756 A1* | 12/2018 | Dave | H04N 21/4788 |

(Continued)

FOREIGN PATENT DOCUMENTS

| | | |
|---|---|---|
| KR | 10-2007-0012059 A | 1/2007 |
| KR | 10-2009-0117014 A | 11/2009 |

(Continued)

*Primary Examiner* — Hien L Duong
(74) *Attorney, Agent, or Firm* — Sughrue Mion, PLLC

(57) ABSTRACT

Disclosed is a method, system, and non-transitory computer-readable record medium for providing a reputation badge for a video chat. The method includes providing a video chat with another user selected through real-time matching based on a request from a user of the computer apparatus; and using a plurality of reputation badges representing different reputation information in the video chat.

20 Claims, 20 Drawing Sheets

(56) References Cited

U.S. PATENT DOCUMENTS

| | | | | |
|---|---|---|---|---|
| 2019/0267134 | A1* | 8/2019 | Van Meter, II | G16H 40/20 |
| 2020/0021777 | A1* | 1/2020 | Borukhoff | H04W 4/16 |
| 2020/0186639 | A1* | 6/2020 | Borukhoff | H04L 65/1076 |
| 2020/0228655 | A1* | 7/2020 | Riswadkar | H04M 3/4285 |

FOREIGN PATENT DOCUMENTS

| | | |
|---|---|---|
| KR | 10-1079550 B1 | 11/2011 |
| KR | 10-2019-0052584 A | 5/2019 |

* cited by examiner

920

920

FIG. 16
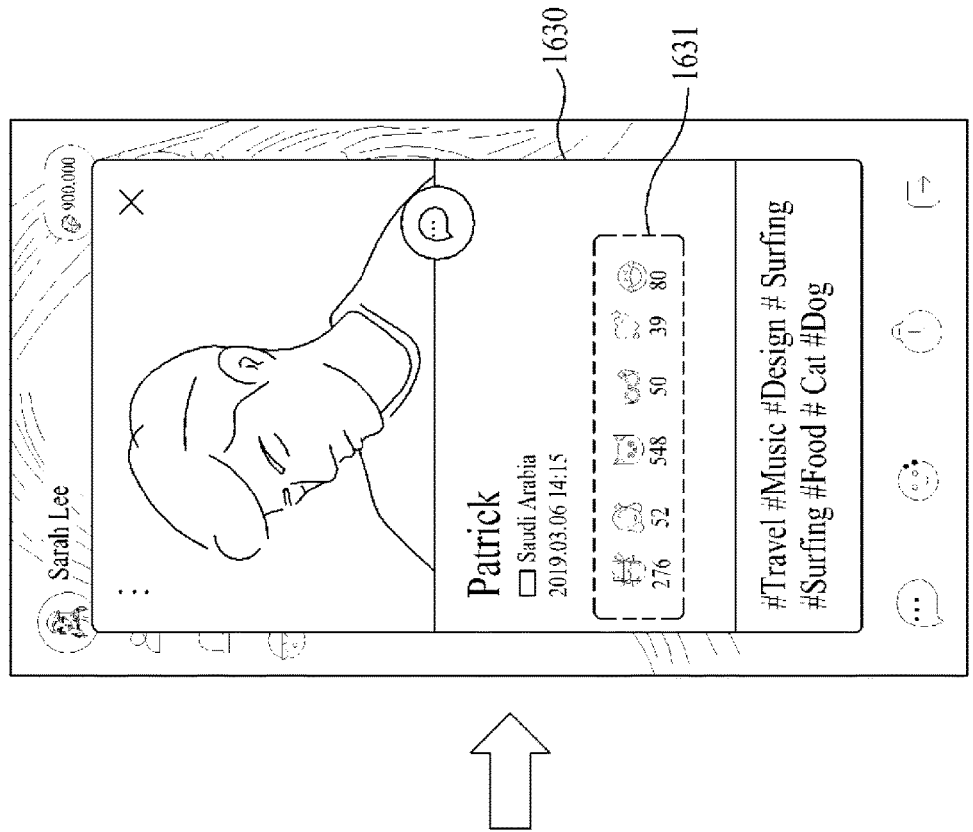
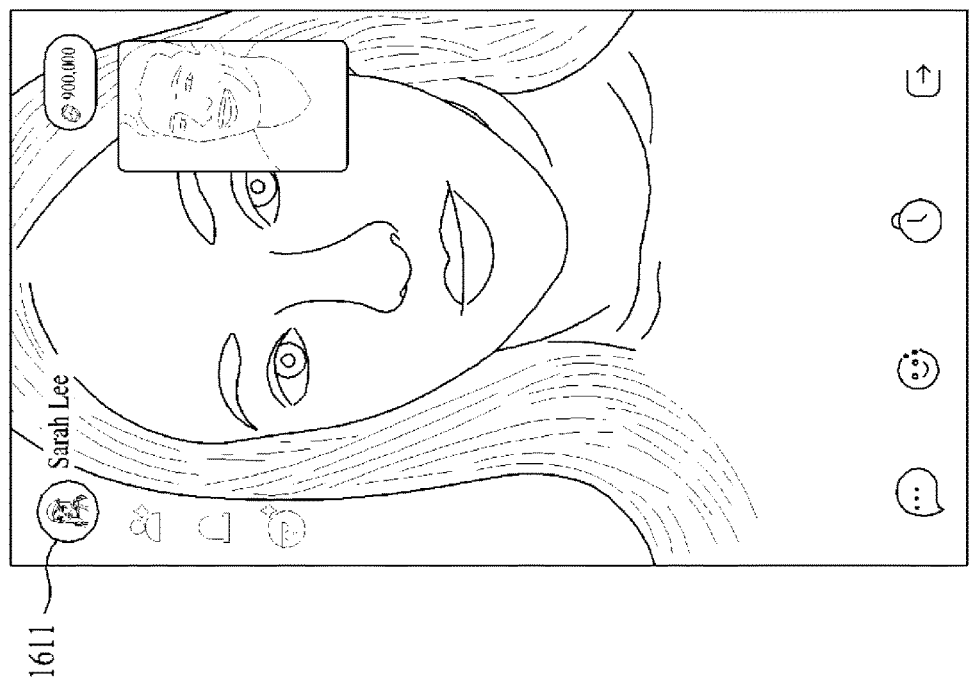

FIG. 17
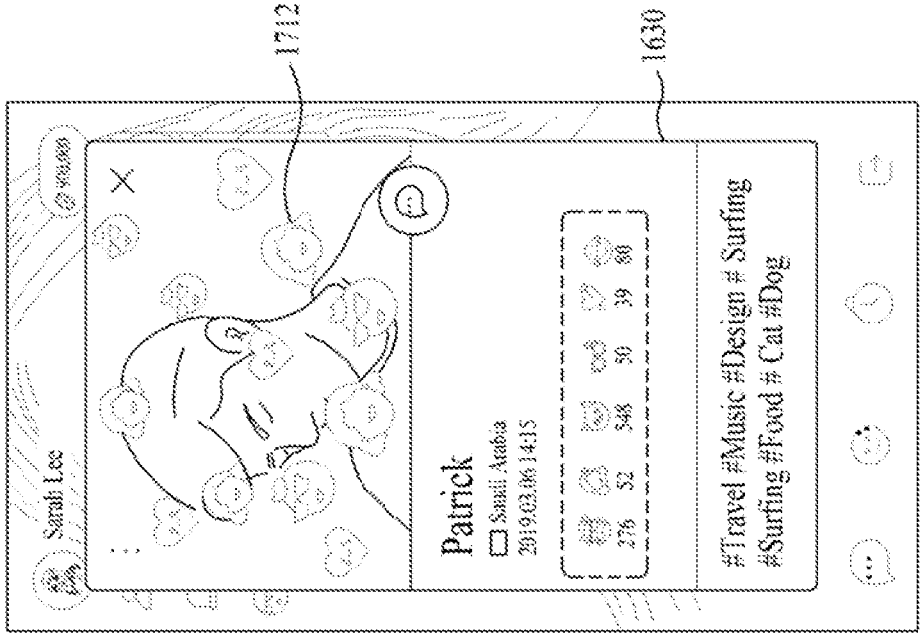
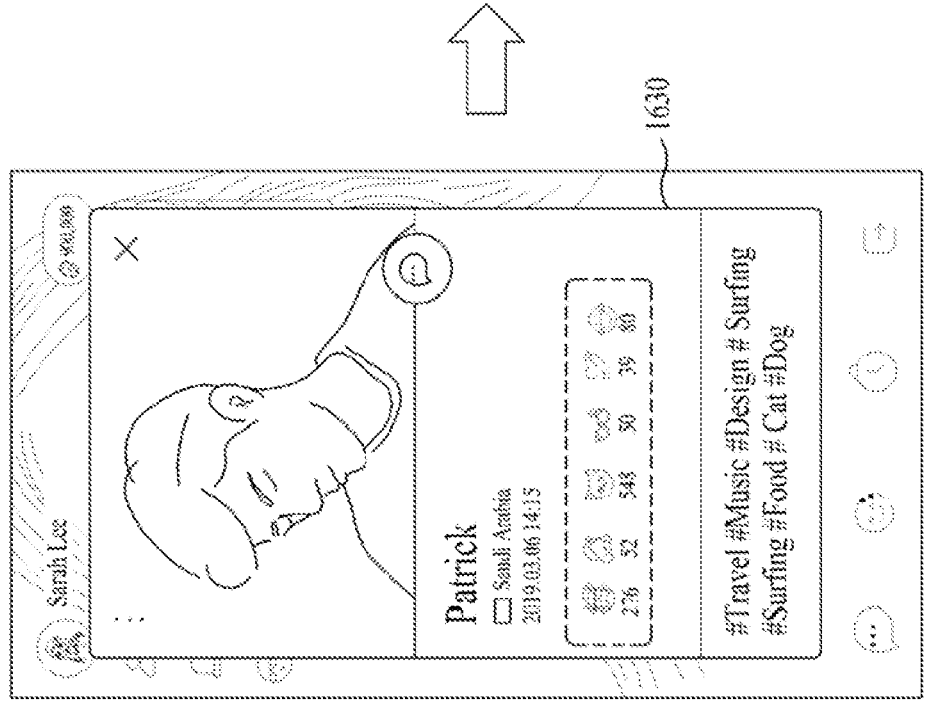

FIG. 20
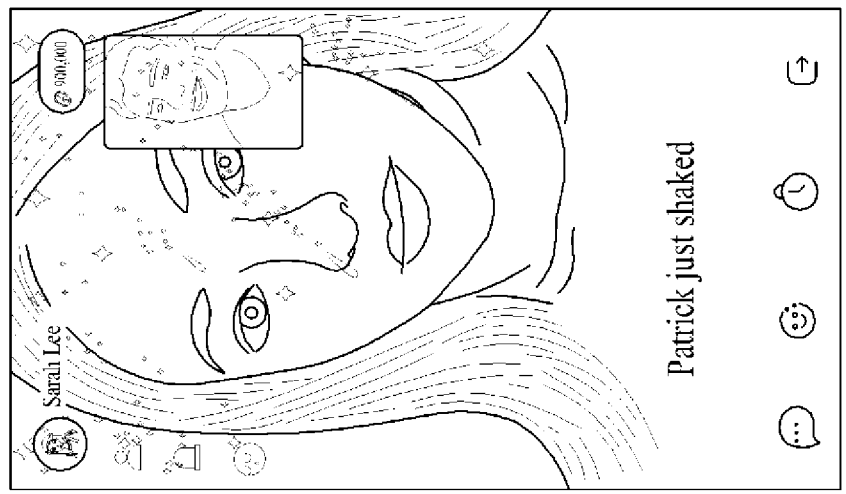
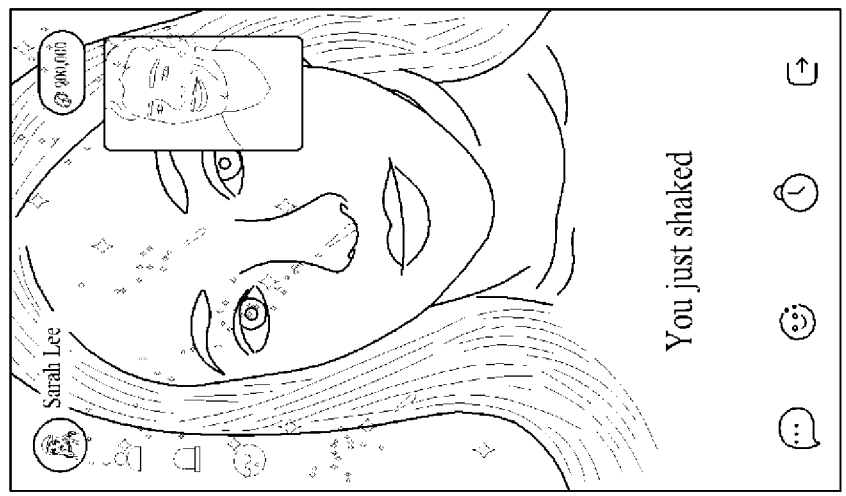

METHOD, SYSTEM, AND NON-TRANSITORY COMPUTER-READABLE RECORD MEDIUM FOR PROVIDING REPUTATION BADGE FOR VIDEO CHAT

CROSS-REFERENCE TO RELATED APPLICATION

This application claims priority to Korean Patent Application No. 10-2019-0151929, filed Nov. 25, 2019 in the Korean Intellectual Property Office, the disclosure of which is incorporated herein by reference in its entirety.

BACKGROUND

1. Field

Apparatuses, systems, and methods according to example embodiments relate to technology for providing a video chat through real-time matching.

2. Description of Related Art

As society diversifies, social gatherings are increasing and various types of finding friends are emerging to facilitate various person-to-person meetings.

An online chat is a method for a person-to-person meeting to share a story by exchanging messages through text, pictures or videos with a plurality of unspecific persons connected through the Internet at the same time. That is, if a user that subscribes to a chat service provided through the Internet inputs personal information and requests a search for a desired style of person, a style of person desired by a corresponding applicant is retrieved based on information extracted from a database and matched.

For example, matching information may be input from mobile communication terminal users and a meeting between the mobile communication terminal users may be arranged to make friends or participate in an event.

SUMMARY

Example embodiments may provide reputation badges that may be used during a video chat.

Example embodiments may provide content determined according to a matching wait time for a video chat.

Example embodiments may recommend a friend through matching based on a type of reputation badge selected by a user.

Example embodiments may display a reputation badge selected by a user during a video chat on a chat screen during a preset period of time.

Example embodiments may provide user profile information that includes reputation badge information updated according to a video chat.

According to an aspect of an example embodiment, there is provided a method performed by a computer apparatus that includes: providing a video chat with another user selected through real-time matching based on a request from a user of the computer apparatus; and using a plurality of reputation badges representing different reputation information in the video chat.

The using may include: displaying a reputation badge list comprising the plurality of reputation badges on a video chat screen based on a reputation badge list request received from the user; transmitting an indication of a reputation badge selected by the user from the reputation badge list to a computer apparatus of the other user; and displaying the selected reputation badge on the video chat screen.

The using may include: receiving an indication of a single reputation badge from among the plurality of reputation badges from the computer apparatus of the other user; and displaying the received reputation badge on the video chat screen.

The reputation badge list request may be received from the user based on a user interaction with a badge list user interface element, and the displaying the received reputation badge further may include updating the badge list user interface element to include an icon corresponding to the single reputation badge.

Each of the plurality of reputation badges may be selectable for the other user up to a threshold number of times during the providing of the video chat.

The method may further include displaying a preview of a front camera of the computer apparatus on a matching wait screen displayed during a matching wait time that is temporally interposed between the request being received and a start of the video chat.

The method may further include displaying at least one piece of additional content on a matching wait screen during a matching wait time that is temporally interposed between the request being received and a start of the video chat.

The displaying of the at least one piece of additional content may include: determining whether an estimated matching wait time of the real-time matching exceeds a preset period of time; and displaying the at least one piece of additional content on the matching wait screen based on determining the estimated matching exceeds the preset period of time. The at least one piece of additional content may be determined based on the estimated matching wait time.

The method may further include: displaying a reputation badge list comprising the plurality of reputation badges on a matching wait screen during a matching wait time that is temporally interposed between the request being received and a start of the video chat; and identifying the other user based on a type of a reputation badge selected by the user from the reputation badge list.

The other user may be selected from a user group of which a cumulative count for the type of the reputation badge selected by the user exceeds a threshold number based on cumulative reputation information of each user.

The method may further include: displaying profile information comprising cumulative reputation information about the other user based on a profile information request received from the user.

The displaying of the profile information may include displaying a plurality of types of reputation badges acquired by the other user and a cumulative count for each of the plurality of types on a profile screen of the other user.

The displaying of the profile information may include displaying, over a profile screen of the other user, a layer indicating a reputation badge acquired by the other user.

According to an aspect of an example embodiment, there is provided a non-transitory computer-readable record medium storing instructions that, when executed by a processor of a computer apparatus, cause the computer apparatus to perform a method that includes: providing a video chat with another user selected through real-time matching based on a request from a user of the computer apparatus; and using a plurality of reputation badges representing different reputation information in the video chat.

According to an aspect of an example embodiment, there is provided a computer apparatus that includes: at least one processor configured to execute computer-readable instructions stored in a memory to: generate a video chat session between a user of the computer apparatus and an electronic device of another user selected through real-time matching and provide a video chat with the other user based on a request from the user of the computer apparatus during the video chat session; and control at least one of a plurality of reputation badges representing different reputation information to be displayed on a video chat screen with the other user.

The at least one processor may be further configured to execute computer-readable instructions stored in the memory to: control a reputation badge list comprising the plurality of reputation badges to be displayed on the video chat screen based on a reputation badge list request received from the user according to a user interaction with a badge list user interface element, control an indication of a reputation badge selected by the user from the reputation badge list to be transmitted to the electronic device of the other user, control the selected reputation badge to be displayed on the video chat screen, control, based on an indication of a single reputation badge from among the plurality of reputation badges being received from the electronic device of the other user, the received reputation badge to be displayed on the video chat screen, and update the badge list user interface element to include an image corresponding to the single reputation badge.

The at least one processor may be further configured to execute computer-readable instructions stored in the memory to control any one or any combination of a preview of a front camera of the computer apparatus and a piece of additional content to be displayed on a matching wait screen during a matching wait time that is temporally interposed between the request being received and a start of the video chat.

The at least one processor may be further configured to: execute computer-readable instructions stored in the memory to select the at least one piece of additional content based on an estimated matching wait time and transfer the selected additional content to the computer apparatus of the user, and display the at least one piece of additional content on the matching wait screen based on the estimated matching wait time exceeding a preset period of time.

The at least one processor may be further configured to execute computer-readable instructions stored in the memory to: control a reputation badge list comprising the plurality of reputation badges to be displayed on a matching wait screen during a matching wait time that is temporally interposed between the request being received and a start of the video chat based on the request, and identify the other user based on a type of a reputation badge selected by the user from the reputation badge list.

The at least one processor may be further configured to execute computer-readable instructions stored in the memory to: control profile information comprising cumulative reputation information about the other user to be displayed on the video chat screen based on a profile information request from the user, identify a cumulative count for each of a plurality of types of reputation badges to be displayed on a profile screen of the other user, and control a layer indicating a reputation badge acquired by the other user to be displayed over the profile screen of the other user.

BRIEF DESCRIPTION OF THE FIGURES

The above and/or other aspects will be more apparent by describing certain example embodiments, with reference to the accompanying drawings, in which:

FIGS. 16 and 17 illustrate examples of describing a process of providing profile information of a video chat counterpart according to at least one example embodiment;

FIGS. 19 and 20 illustrate examples of describing a good feeling expression process according to terminal shaking according to at least one example embodiment.

DETAILED DESCRIPTION

Figure 1:
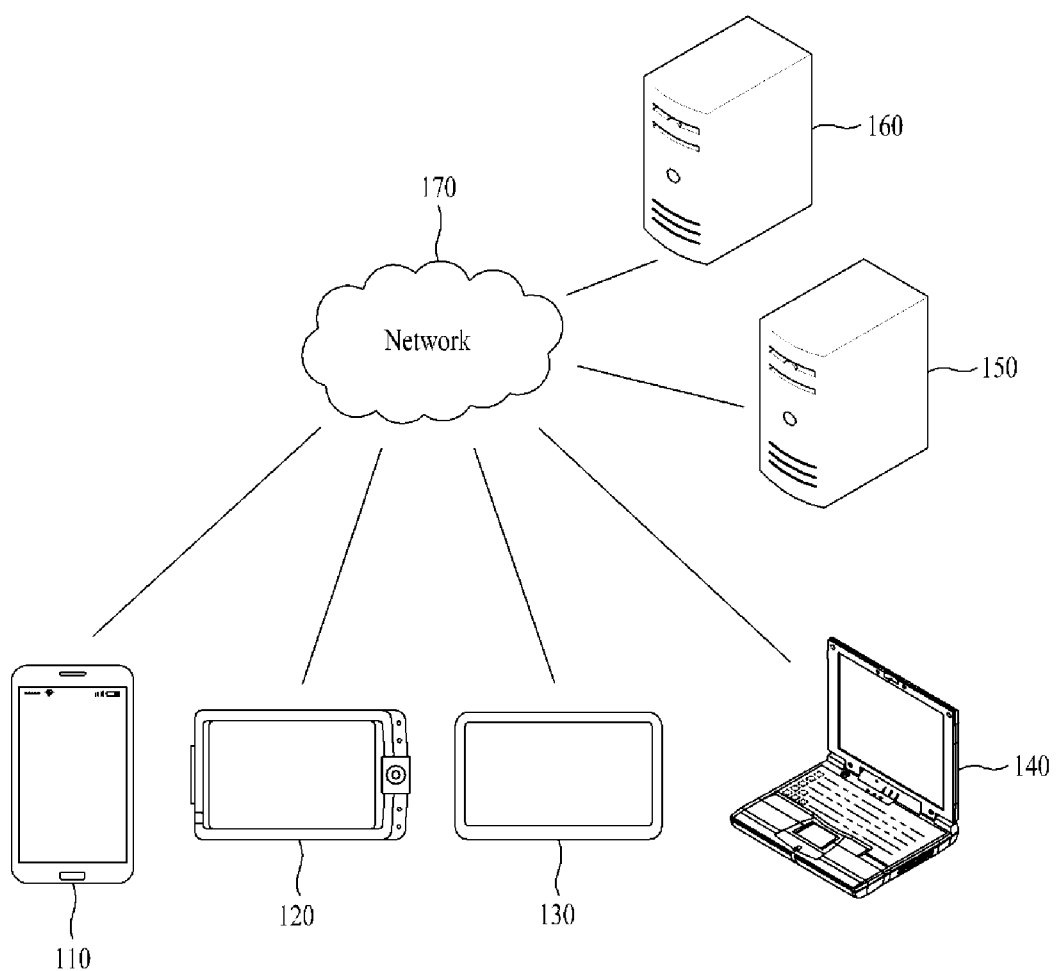
FIG. 1 is a diagram illustrating an example of a network environment according to at least one example embodiment.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

One or more example embodiments will be described in detail with reference to the accompanying drawings. Example embodiments, however, may be embodied in various different forms, and should not be construed as being limited to only the illustrated example embodiments. Rather, the illustrated example embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware and/or a combination of hardware and software. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor), Central Processing Unit (CPU), a controller, an arithmetic logic unit (ALU), a digital signal processor, a microcomputer, a microprocessor, etc., the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer record medium or device, capable of providing instructions or data to, or being interpreted by, a hardware device. The software also may be distributed over network coupled computer systems so that the software is stored and executed in a distributed fashion. In particular, for example, software and data may be stored by one or more computer readable record mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable record medium into the one or more storage devices and/or one or more computer processing devices using a drive mechanism. Such separate computer readable record medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable record medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

The example embodiments relate to technology for providing a video chat through real-time matching.

The example embodiments including the disclosures herein may provide a reputation badge available as a good feeling expression and a fun factor during a video chat through real-time matching.

FIG. 1 illustrates an example of a network environment according to at least one example embodiment. Referring to FIG. 1, the network environment may include a plurality of electronic devices 110, 120, 130, and 140, a plurality of servers 150 and 160, and a network 170. FIG. 1 is provided as an example only. A number of electronic devices or a number of servers is not limited thereto.

Each of the plurality of electronic devices 110, 120, 130, and 140 may be a stationary terminal or a mobile terminal that is configured as a computer apparatus. For example, the plurality of electronic devices 110, 120, 130, and 140 may be a smartphone, a mobile phone, a navigation device, a computer, a laptop computer, a digital broadcasting terminal, a personal digital assistant (PDA), a portable multimedia player (PMP), a tablet PC, a game console, a wearable device, an Internet of things (IoT) device, a virtual reality (VR) device, an augmented reality (AR) device, and the like. For example, although FIG. 1 illustrates a shape of a smartphone as an example of the electronic device 110, the electronic device 110 used herein may refer to one of various types of physical computer apparatuses capable of communicating with other electronic devices 120, 130, and 140, and/or the servers 150 and 160 over the network 170 in a wireless or wired communication manner.

The communication scheme is not limited and may include a near field wireless communication scheme between devices as well as a communication scheme using a communication network (e.g., a mobile communication network, wired Internet, wireless Internet, a broadcasting network, a satellite network, etc.) includable in the network 170. For example, the network 170 may include at least one of network topologies that include a personal area network (PAN), a local area network (LAN), a campus area network (CAN), a metropolitan area network (MAN), a wide area network (WAN), a broadband network (BBN), Internet, and the like. Also, the network 170 may include at least one of network topologies that include a bus network, a star network, a ring network, a mesh network, a star-bus network, a tree or hierarchical network, and the like. However, they are provided as examples only.

Each of the servers 150 and 160 may be configured as a computer apparatus or a plurality of computer apparatuses that provides an instruction, a code, a file, content, a service, etc., through communication with the plurality of electronic devices 110, 120, 130, and 140 over the network 170. For example, the server 150 may be a system that provides a first service to the plurality of electronic devices 110, 120, 130, and 140 connected over the network 170. The server 160 may be a system that provides a second service to the plurality of electronic devices 110, 120, 130, and 140 connected over the network 170. In detail, the server 150 may provide a service (e.g., a friend finding service, etc.) intended by an application through the application as a computer program installed and executed on the plurality of electronic devices 110, 120, 130, and 140, as the first service. As another example, the server 160 may provide the plurality of electronic devices 110, 120, 130, and 140 with a service that distributes a file for installing and executing the application, as the second service.

Figure 2:
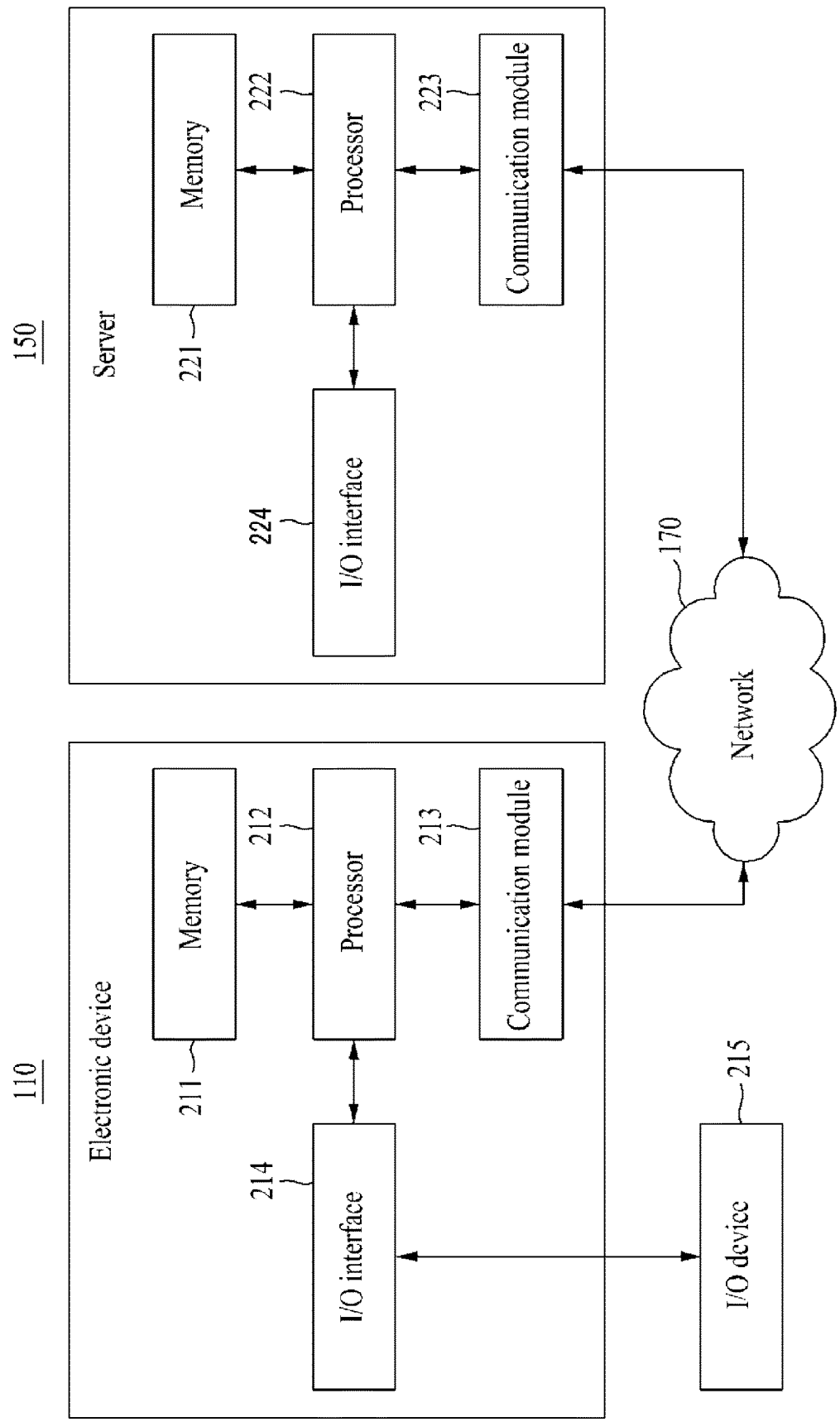
FIG. 2 is a diagram illustrating an example of a configuration of an electronic device and a server according to at least one example embodiment.

FIG. 2 is a block diagram illustrating an example of an electronic device and a server according to example embodiments. Description is made using the electronic device 110 as an example of the electronic device and the server 150 as an example of the server with reference to FIG. 2. Also, the other electronic devices 120, 130, and 140 or the server 160 may have the same or similar configuration as that of the electronic device 110 or the server 150.

Referring to FIG. 2, the electronic device 110 may include a memory 211, a processor 212, a communication interface 213, and an input/output (I/O) interface 214, and the server 150 may include a memory 221, a processor 222, a communication interface 223, and an I/O interface 224. The memory 211, 221 may include a permanent mass storage device, such as random access memory (RAM), read only memory (ROM), a disk drive, a solid state drive (SSD), a flash memory, etc., as a non-transitory computer-readable record medium. The permanent mass storage device, such as ROM, SSD, flash memory, and disk drive, may be included in the electronic device 110 or the server 150 as a permanent storage device separate from the memory 211, 221. Also, an OS and at least one program code (e.g., a code for a browser installed and executed on the electronic device 110 or an application installed and executed on the electronic device 110 to provide a specific service) may be stored in the memory 211, 221. Such software components may be loaded from another non-transitory computer-readable record medium separate from the memory 211, 221. The other non-transitory computer-readable record medium may include a non-transitory computer-readable record medium, for example, a floppy drive, a disk, a tape, a DVD/CD-ROM drive, a memory card, etc. According to other example embodiments, software components may be loaded to the memory 211, 221 through the communication interface 213, 223, instead of the non-transitory computer-readable record medium. For example, at least one program may be loaded to the memory 211, 221 based on a computer program, for example, the application, installed by files provided over the network 170 from developers or a file distribution system, for example, the server 160, providing an installation file of the application.

The processor 212, 222 may be configured to process instructions of a computer program by performing basic arithmetic operations, logic operations, and I/O operations. The computer-readable instructions may be provided from the memory 211, 221 or the communication interface 213, 223 to the processor 212, 222. For example, the processor 212, 222 may be configured to execute received instructions in response to the program code stored in the storage device, such as the memory 211, 221.

The communication interface 213, 223 may provide a function for communication between the electronic device 110 and the server 150 over the network 170 and may provide a function for communication between the electronic device 110 and another electronic device, for example, the electronic device 120, or another server, for example, the server 160, and/or between the server 150 and another electronic device or server. For example, the processor 212 of the electronic device 110 may transfer a request created based on a program code stored in the storage device such as the memory 211, to the server 150 over the network 170 under control of the communication interface 213. The electronic device 110 may receive a control signal, an instruction, content, a file, etc., provided under control of the processor 222 of the server 150 through the communication interface 213 of the electronic device 110, from the communication interface 223 of the server 150. For example, a control signal, an instruction, content, a file, etc., of the server 150 received through the communication interface 213 may be transferred to the processor 212 or the memory 211, and content, a file, etc., may be stored in a storage medium, for example, the permanent storage device, further includable in the electronic device 110.

The I/O interface 214 may be a device used for interface with an I/O apparatus 215. For example, an input device may include a device, such as a keyboard, a mouse, a microphone, a camera, etc., and an output device may include a device, such as a display, a speaker, a haptic feedback device, etc. As another example, the I/O interface 214 may be a device for interface with an apparatus in which an input function and an output function are integrated into a single function, such as a touchscreen. The I/O apparatus 215 may be configured as a single device with the electronic device 110. Also, the I/O interface 224 of the server 150 may be a device for interface with an apparatus for input or output that may be connected to the server 150 or included in the server 150. In detail, when the processor 212 of the electronic device 110 processes an instruction of a computer program loaded to the memory 221, content or a service screen configured based on data provided from the server 150 or the electronic device 120 may be displayed on the display through the I/O interface 214.

According to other example embodiments, the electronic device 110 and the server 150 may include a number of components less than or greater than a number of components shown in FIG. 2. For example, the electronic device 110 may include at least a portion of the I/O apparatus 215, or may further include other components, for example, a transceiver, a global positioning system (GPS) module, a camera, a variety of sensors, a database (DB), and the like. In detail, if the electronic device 110 is a smartphone, the electronic device 110 may be configured to further include a variety of components, for example, an accelerometer sensor, a gyro sensor, a camera module, various physical buttons, a button using a touch panel, an I/O port, a vibrator for vibration, etc., which are generally included in the smartphone.

Hereinafter, example embodiments of a method and system for providing a reputation badge for a video chat are described.

The example embodiments may provide a video chat through real-time matching and may use a reputation badge for recommending a friend and expressing a "good feeling" for a counterpart during a video chat, or may use the reputation badge as various fun factors during the video chat.

Herein, the term "reputation badge" refers to a single function of a video chat for expressing an image of a counterpart. The reputation badge is configured as a badge of an image representing each piece of reputation information by classifying reputation information into various types, such as, for example, handsome, pretty, cute, stylish, lovely, and humorous.

Figure 3:
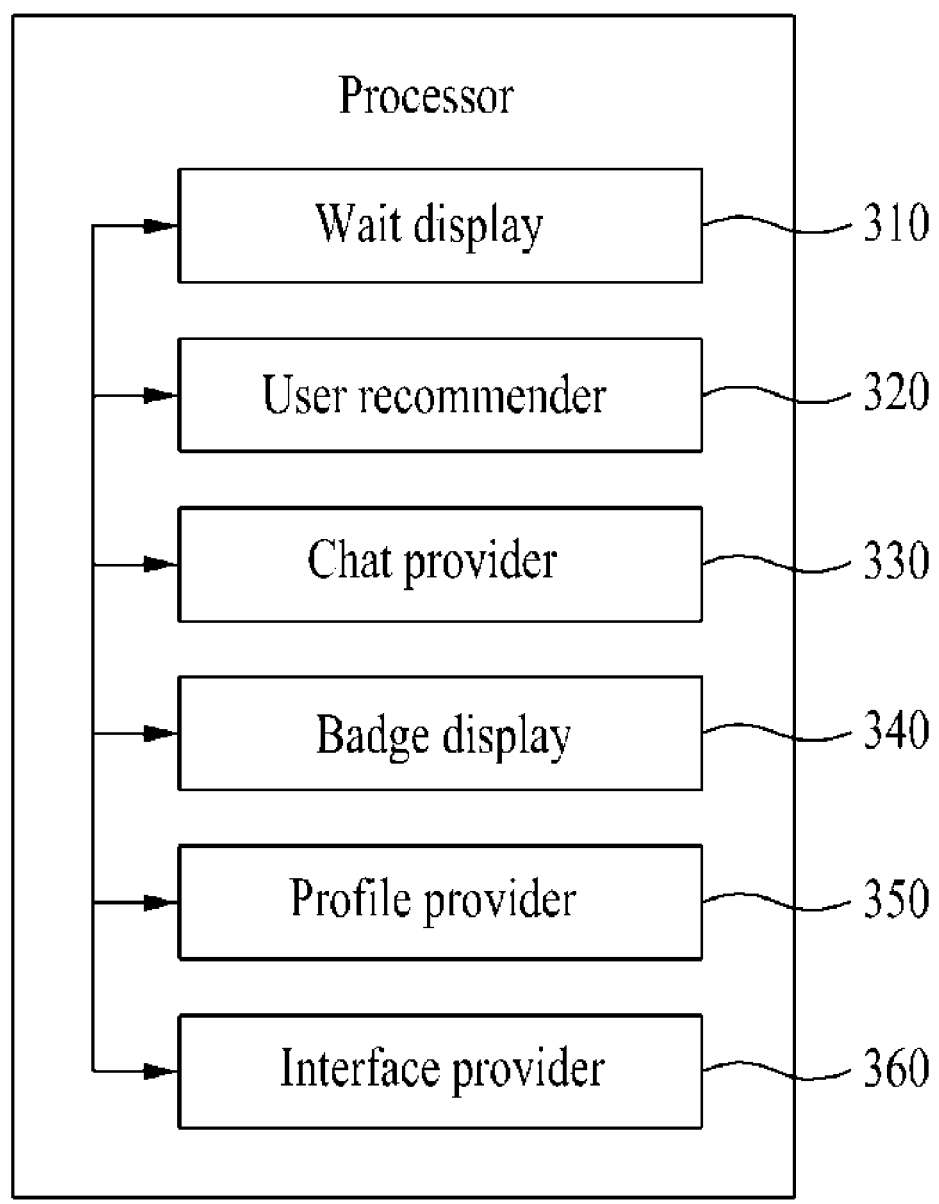
FIG. 3 is a diagram illustrating an example of components includable in a processor of an electronic device according to at least one example embodiment.

FIG. 3 is a diagram illustrating an example of components includable in a processor of an electronic device according to at least one example embodiment.

A computer-implemented video chat system may be configured in the electronic device 110 according to the example embodiment. For example, the video chat system may be configured in a form of an independently operating program or may be configured in an in-app form of a specific application to be operable on the specific application. Depending on example embodiments, the video chat system may provide a video chat-based friend finding service through interaction with the server 150.

The video chat system implemented in the electronic device 110 may perform the following video chat method in response to an instruction provided from an application installed on the electronic device 110.

Referring to FIG. 3, to perform the video chat method, the processor 212 of the electronic device 110 may include a wait display 310, a user recommender 320, a chat provider 330, a badge display 340, a profile provider 350, and an interface provider 360 as components. Depending on example embodiments, the components of the processor 212 may be selectively included in or excluded from the processor 212. Also, depending on example embodiments, the components of the processor 212 may be separated or merged for functional representation of the processor 212.

The processor 212 may read a necessary instruction from the memory 211 to which instructions associated with control of the electronic device 110 are loaded. In this case, the read instruction may include an instruction for controlling the processor 212 to perform the following video chat method.

The processor 212 and the components of the processor 212 may control the electronic device 110 to perform operations included in the video chat method. For example, the processor 212 and the components of the processor 212 may be configured to execute an instruction according to a code of at least one program and a code of an OS included in the memory 211.

Here, the components of the processor 212 may be representations of different functions of the processor 212 performed by the processor 212 in response to an instruction provided from a program code stored in the electronic device 110, for example, an instruction provided from an application executed on the electronic device 110. For example, the chat provider 330 may be used as a functional representation of the processor 212 that controls the electronic device 110 to provide a video chat.

Figure 4:
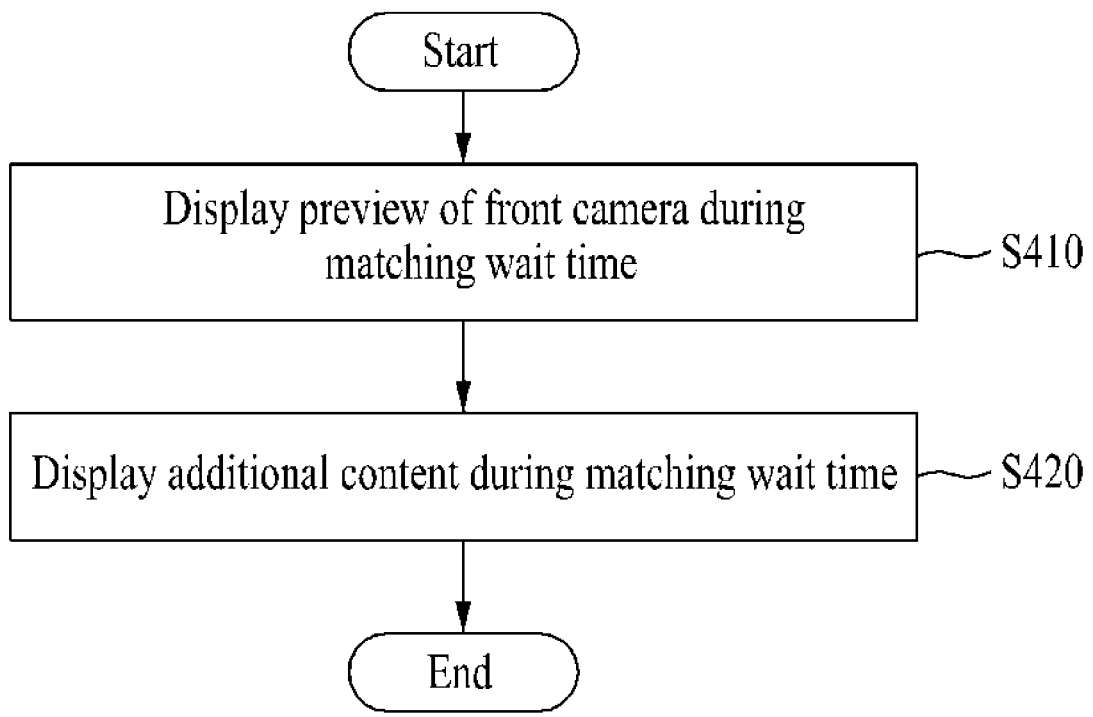
FIG. 4 is a flowchart illustrating an example of a matching wait method performed by an electronic device according to at least one example embodiment.

FIG. 4 is a flowchart illustrating an example of a matching wait method performed by an electronic device according to at least one example embodiment.

Referring to FIG. 4, in operation S410, in response to receiving a matching request for a video chat from a user (hereinafter, a first user) of the electronic device 110 after execution of an application installed on the electronic device 110, the wait display 310 may transfer the matching request from the first user to the server 150, and here, may display a preview of a front camera on a screen of the application during a matching wait time. The wait display 310 may provide a preview of the front camera during a matching wait time until a video call session between the first user and a user (hereinafter, a second user) of another electronic device, for example, the electronic device 120, is generated through interaction with the server 150. The first user may verify a face of the first user or a peripheral environment through the preview before matching.

The server 150 may provide a video chat through real-time matching between users of the plurality of electronic devices 110, 120, 130, and/or 140, each of which has an exclusive application installed thereon. Here, real-time matching relates to selecting the user second from the entire users or a user group corresponding to a profile restricted by the first user, randomly or based on an inter-user matching probability. The server 150 may generate a video chat session between the electronic device 110 of the first user and the electronic device 120 of the second user selected through real-time matching and may provide the video chat in real time.

Figure 5:
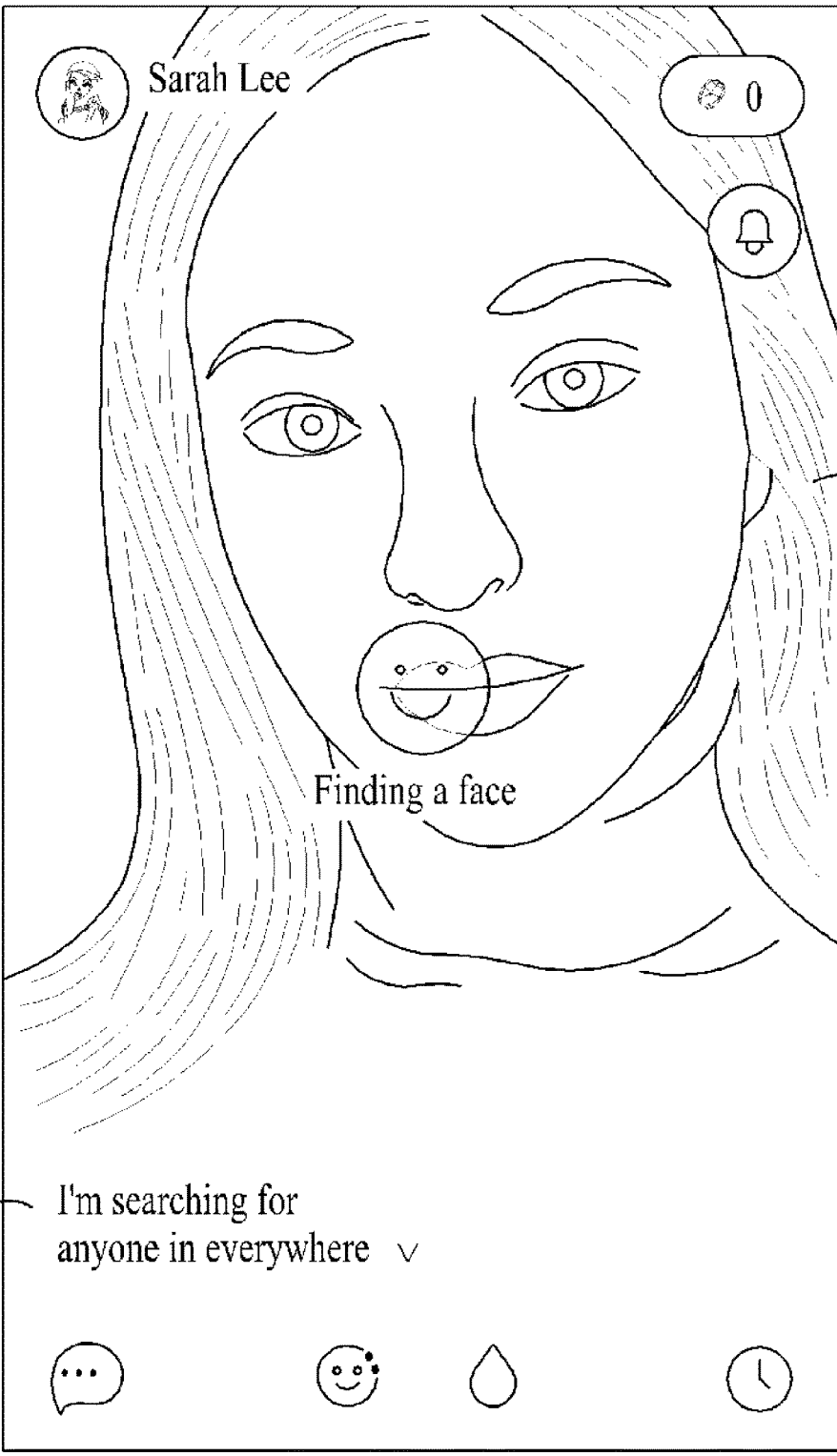
FIGS. 5 and 6 illustrate examples of describing a matching wait process for a video chat according to at least one example embodiment.

FIG. 5 illustrates a matching wait screen 500 displayed on the electronic device 110 according to at least one example embodiment.

Referring to FIG. 5, the processor 212 may control display of the matching wait screen 500 until matching is performed in response to a friend matching request from the first user. Here, profile information of the first user may be displayed on the matching wait screen 500. In particular, a preview 501 of a front camera may be displayed on the matching wait screen 500. The processor 212 may recognize a face of the first user through the matching wait screen 500 and may transfer a matching request from the first user to the server 150 with a picture of the recognized face. The matching wait screen 500 may further include a menu that allows the first user to set a gender and a region of a friend with which the first user desires to have a video chat. For example, the processor 212 may control display of a status message 51 representing a matching wait state through the matching wait screen 500 during a matching wait time. Here, if the user restricts a profile of a counterpart corresponding to desired matching of the user, the status message 51 may be automatically changed. For example, if the user does not restrict the profile before the matching request, the status message 51 may be displayed as "I'm searching for anyone in everywhere." If the user restricts the profile to men living in Asia, the status message 51 may be changed to be "I'm searching for men in Asia." Also, if the user selects a portion of the status message 51, an interface capable of changing a desired matching condition of the user may be provided. For example, in response to a selection on a portion "everywhere" in the status message 51 of "I'm searching for anyone in everywhere," a list of selectable regions, such as, for example, Asia, Europe, etc., may be displayed. In response to a selection from the user on Europe, one of users in Europe may be matched as another user.

Figure 6:
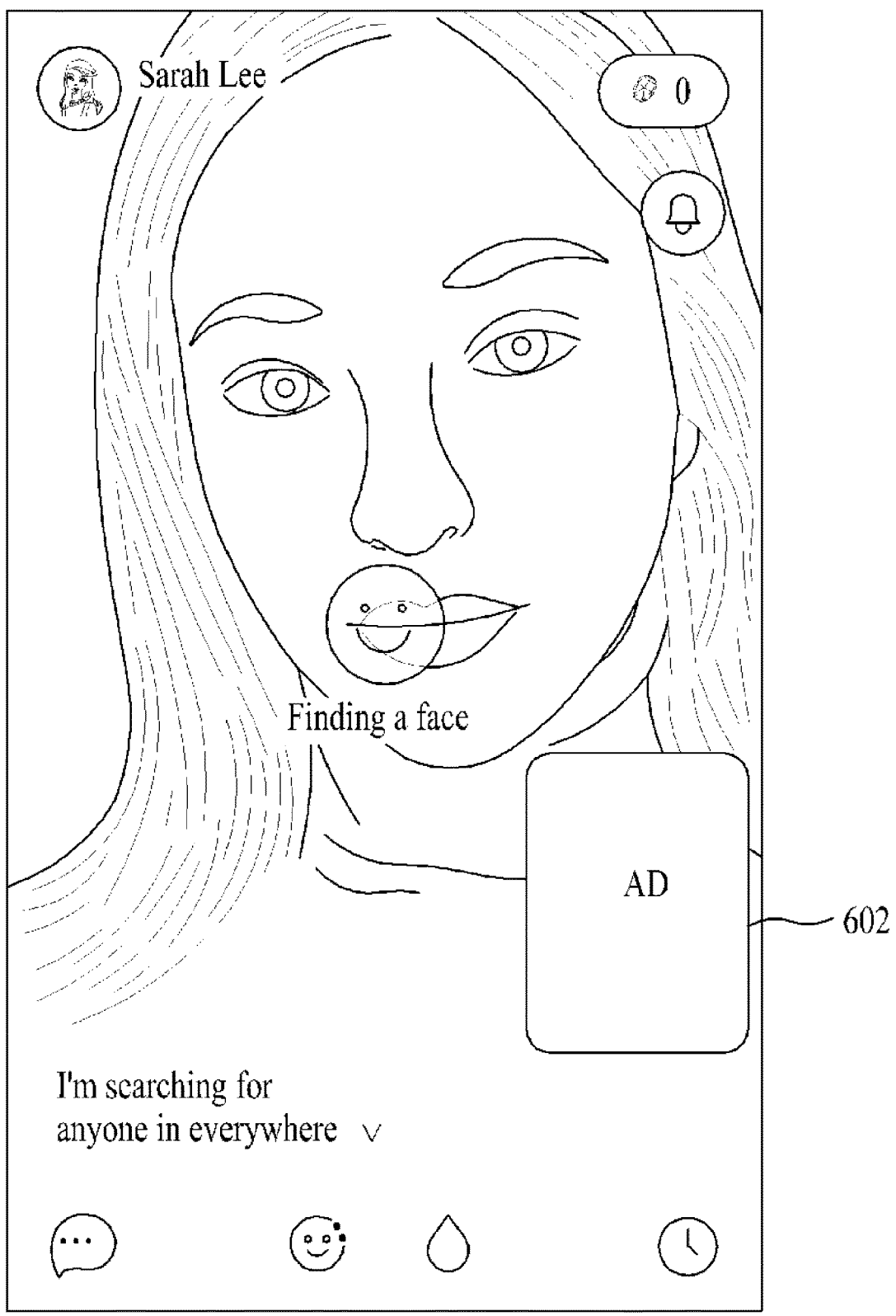

Referring again to FIG. 4, in operation S420, the wait display 310 may display additional content with the preview of the front camera during a matching wait time. For example, if a preset period of time elapses after entry into a matching wait state, the wait display 310 may determine that a matching probability is low and may display at least one piece of additional content on the matching wait screen. Referring to FIG. 6, if a preset period of time elapses during a matching wait time, the processor 212 may control display of additional content 602, such as advertisement (AD), on the matching wait screen 500.

The additional content 602 may include, for example, advertisement and quiz, as at least one piece of content among contents registered to a content platform associated with the server 150. The additional content 602 may be selected by the server 150 and transferred to the electronic device 110, and may be determined based on, for example, an estimated matching wait time. The estimated matching wait time refers to a time estimated until a video call session between the first user and the second user is generated and may be determined based on user information of a user in a connection wait state. For example, the server 150 may select the additional content 602 of which a running time is within the estimated matching wait time and may transfer the selected additional content 602 to the electronic device 110. The processor 212 may determine whether matching may be performed within a preset period of time at a point in time at which a predetermined (or, alternatively, desired) period of time elapses during a matching wait time. Here, when the matching is estimated to not be performed within the preset period of time, the processor 212 may control display of, on the matching wait screen 500, the additional content 602 transferred from the server 150.

Therefore, the processor 212 may control display of the preview of the front camera in the matching wait state before matching for the video chat is performed and may further display additional content selected based on a predetermined (or, alternatively, desired) condition, for example, an estimated matching wait time, during a matching wait time.

Further, the processor 212 may provide a blur application function to a front camera image with the preview of the front camera. In addition to the blur application function, the processor 212 may provide a face filter function, a face reduction function, a beauty function, and a sticker application function, which may apply to an image of the first user during the video chat.

Figure 7:
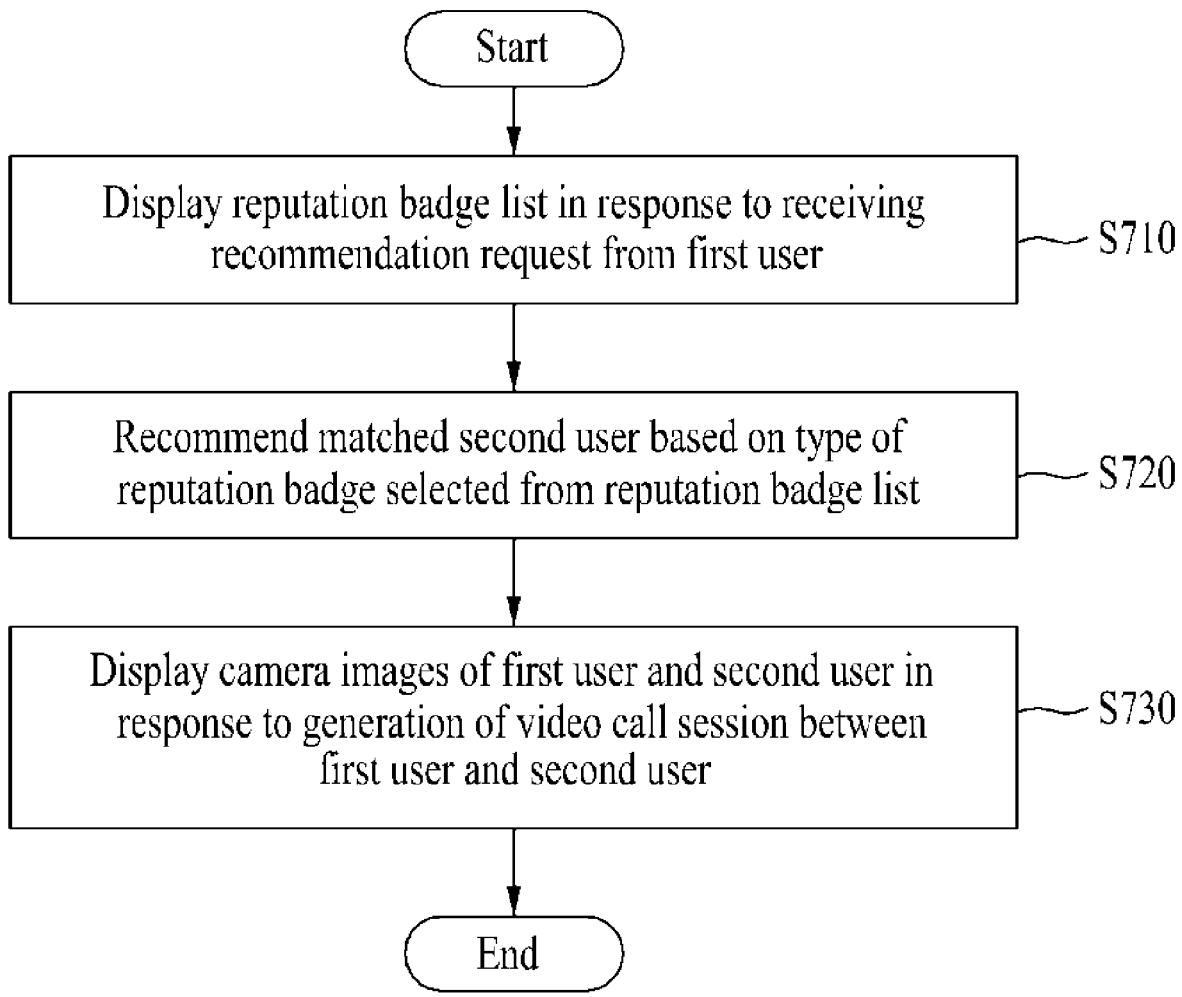
FIG. 7 is a flowchart illustrating an example of a video chat method through matching performed by an electronic device according to at least one example embodiment.

FIG. 7 is a flowchart illustrating another example of a method performed by an electronic device according to at least one example embodiment.

Referring to FIG. 7, in operation S710, in response to receiving a request for using a recommendation card from a first user of the electronic device 110, the badge display 340 may display a reputation badge list available for a video chat. The recommendation card corresponds to a function of receiving a recommendation for a friend having a reputation of a type desired by the user. If the user desires to use the recommendation card, the badge display 340 may preferentially display a reputation badge list selectable by the user.

Figure 8:
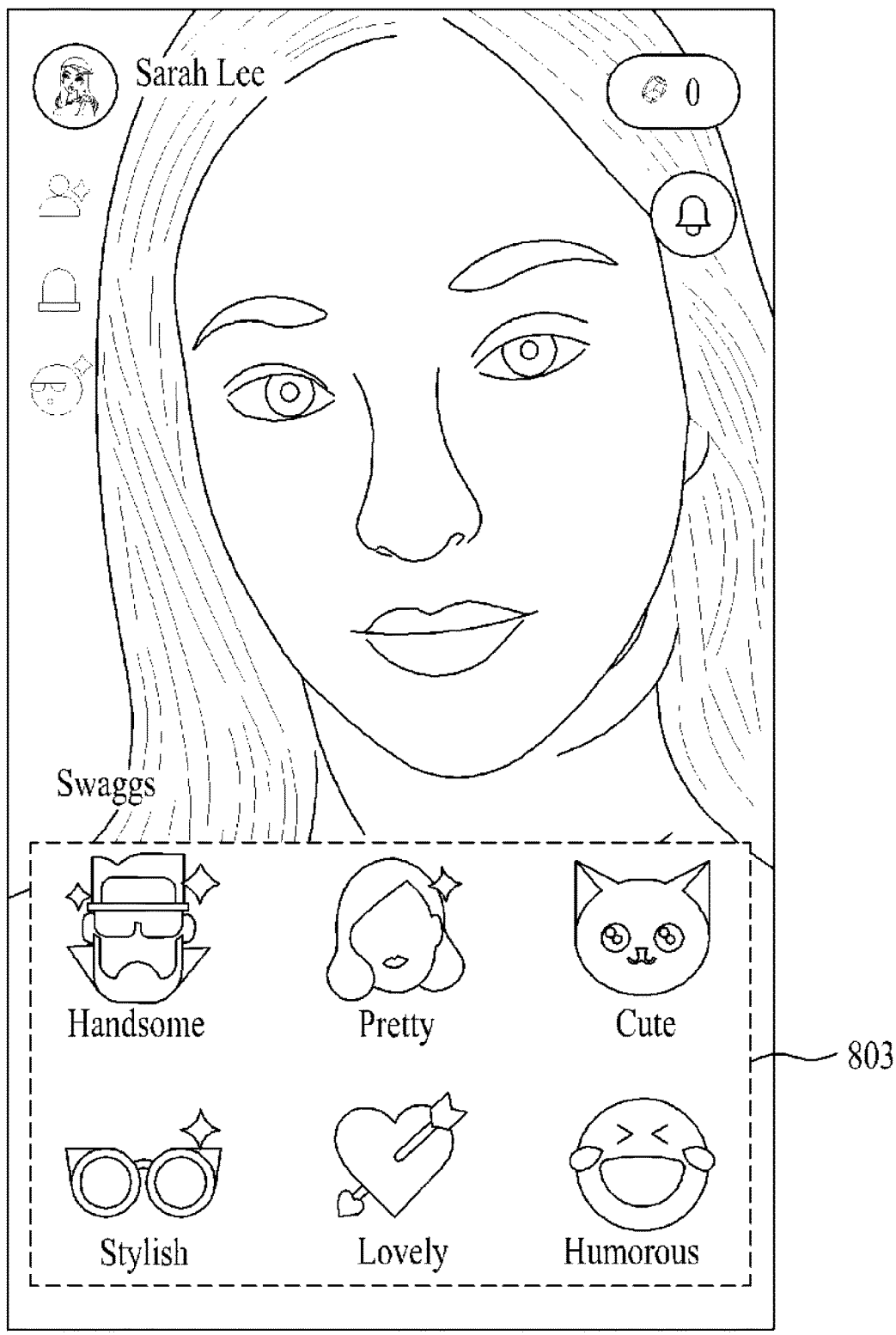
FIGS. 8 to 10 illustrate examples of describing a video chat process according to at least one example embodiment.

For example, referring to FIG. 8, in response to a request from the first user for using a recommendation card on the matching wait screen 500, the badge display 340 may display a reputation badge list 803 on the matching wait screen 500. The reputation badge list 803 may include badges representing different types of reputation information.

Referring again to FIG. 7, in operation S720, the user recommender 320 may receive, from the electronic device 110, a reputation badge selected by the first user from the reputation badge list and may recommend a matched second user based on a type of the reputation badge selected by the first user. The user recommender 320 may recognize the reputation badge selected by the first user from the reputation badge list and may transfer, to the server 150, the matching request from the first user that includes a type of the recognized reputation badge and may recommend the second user for the first user according to a matching result at the server 150.

The server 150 may accumulate a reputation badge acquired from a counterpart during a video chat with respect to each user using a friend finding service and may manage a cumulative count for each type of a reputation badge with profile information. The server 150 may recommend the second user based on the reputation badge selected by the first user and reputation badge information included in profile information for each user. Here, for example, the server 150 may recommend at least one other user among other users having a relatively large cumulative count for the reputation badge selected by the first user. If the recommendation card includes cards of three users, the server 150 may select three other users in descending order of a cumulative count for the reputation badge selected by the first user and may recommend the selected three other users to the first user. For example, the first user may select one of the three other users as the second user. As another example, the server 150 may randomly select the second user from a user group of which a cumulative count for the reputation badge selected by the first user exceeds a desired number and may provide the selected second user as a matching result. As another example, the server 150 may select the second user corresponding to a condition, for example, an age, a region, a gender, and interest, preferred by the first user from a user group of which a cumulative count for the reputation badge selected by the first user exceeds a desired number and may provide the selected second user as a matching result.

The user recommender 320 may recommend the second user having a reputation of a type preferred by the first user based on the reputation badge selected by the first user through interaction with the server 150.

In operation S730, the chat provider 330 may provide a video chat between the first user and the second user in response to the first user accepting the video chat with the second user. Once the video chat session between the first user and the second user is generated in response to the first user accepting the video chat with the second user, the chat provider 330 may display a video chat screen that includes camera images of the first user and the second user.

Figure 9:
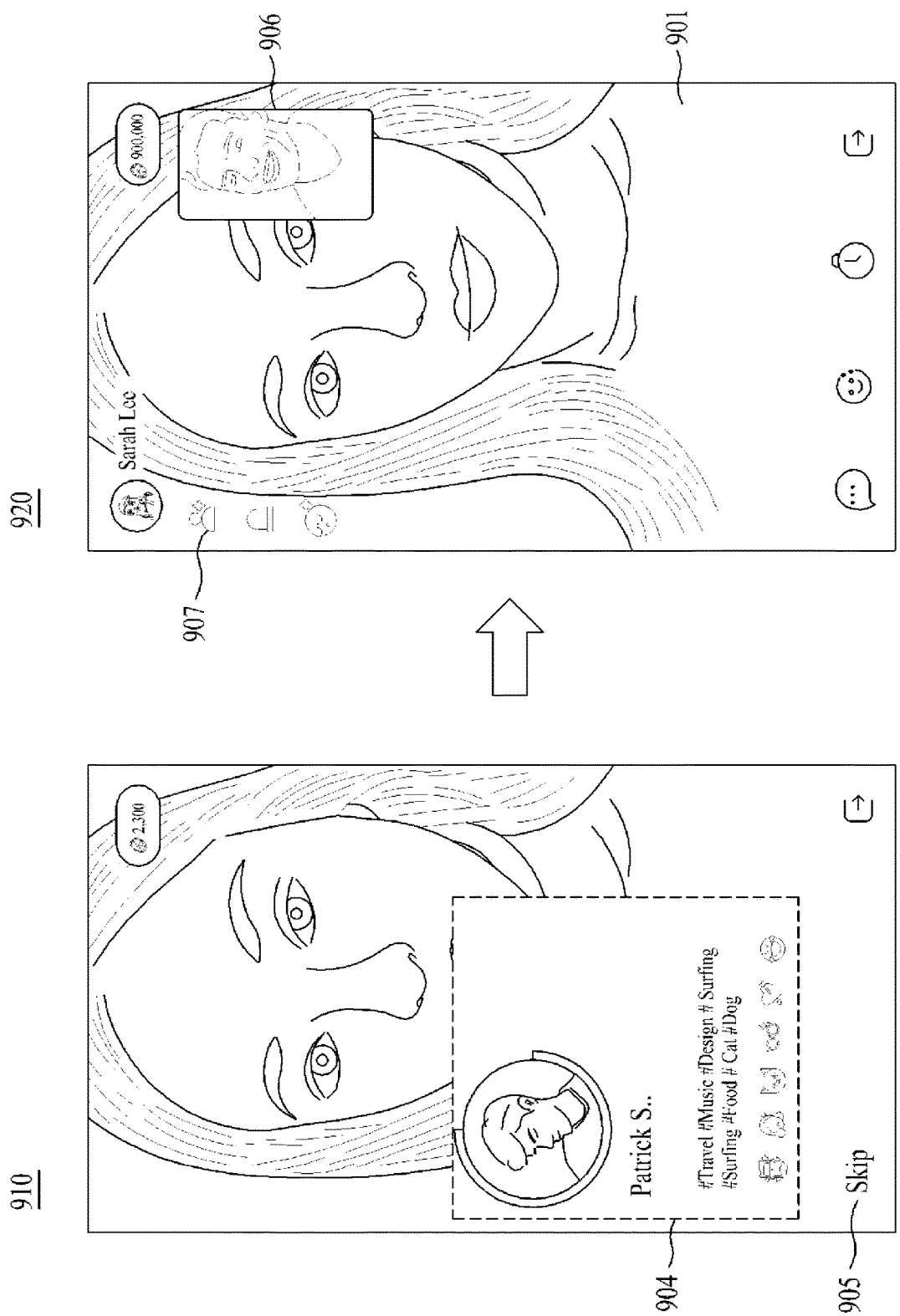

Referring to FIG. 9, the chat provider 330 may display a chat entry screen 910 in response to the second user being determined through matching. Here, profile information 904 of the second user may be displayed on the chat entry screen 910. The profile information 904 may include a name, a region, and a field of interest of the second user. In particular, the profile information 904 may include information about a reputation badge acquired by the second user. For example, the profile information 904 may include a reputation badge list including an acquisition history of the second user. Here, the reputation badge list may be sorted in descending order of a cumulative count and thereby displayed.

The chat entry screen 910 may include a 'Skip' user interface (UI) 905 element for cancelling the video chat with the second user. In response to connection of a video call session between the first user and the second user while a no-input state of the 'Skip' UI element 905 from the first user on the chat entry screen 910 is maintained, the video chat may start and the chat provider 330 may display a video chat screen 920 accordingly. In response to an input on the 'Skip' UI element 905, the video chat may be canceled and the video chat may not start.

A second user image 906 received from the electronic device 120, for example, input from a front camera of the electronic device 120 through a video call session with a first user image 901 input from a front camera of the electronic device 110 may be displayed on the video chat screen 920.

Figure 10:
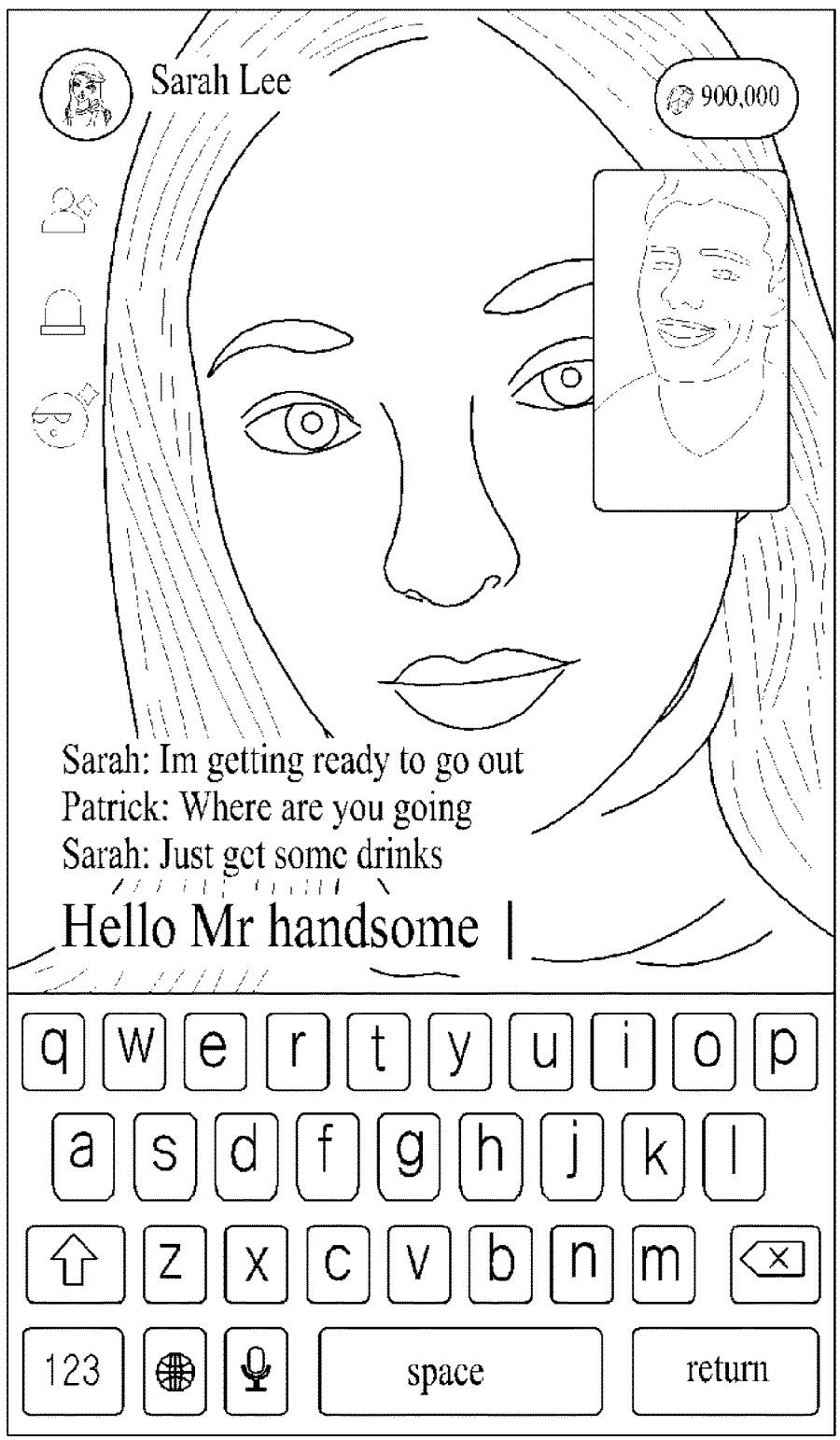

In response to an input from the first user on a friend add UI element 907 after the video chat starts, the chat provider 330 may add the second user to a friend list and may support a text chat with the video chat through the video chat screen 920 of FIG. 10.

Therefore, the processor 212 may recommend the second user having the reputation of the type preferred by the first user based on the reputation badge selected by the first user and may support the text chat in the video chat as well as the video chat with the second user.

Figure 11:
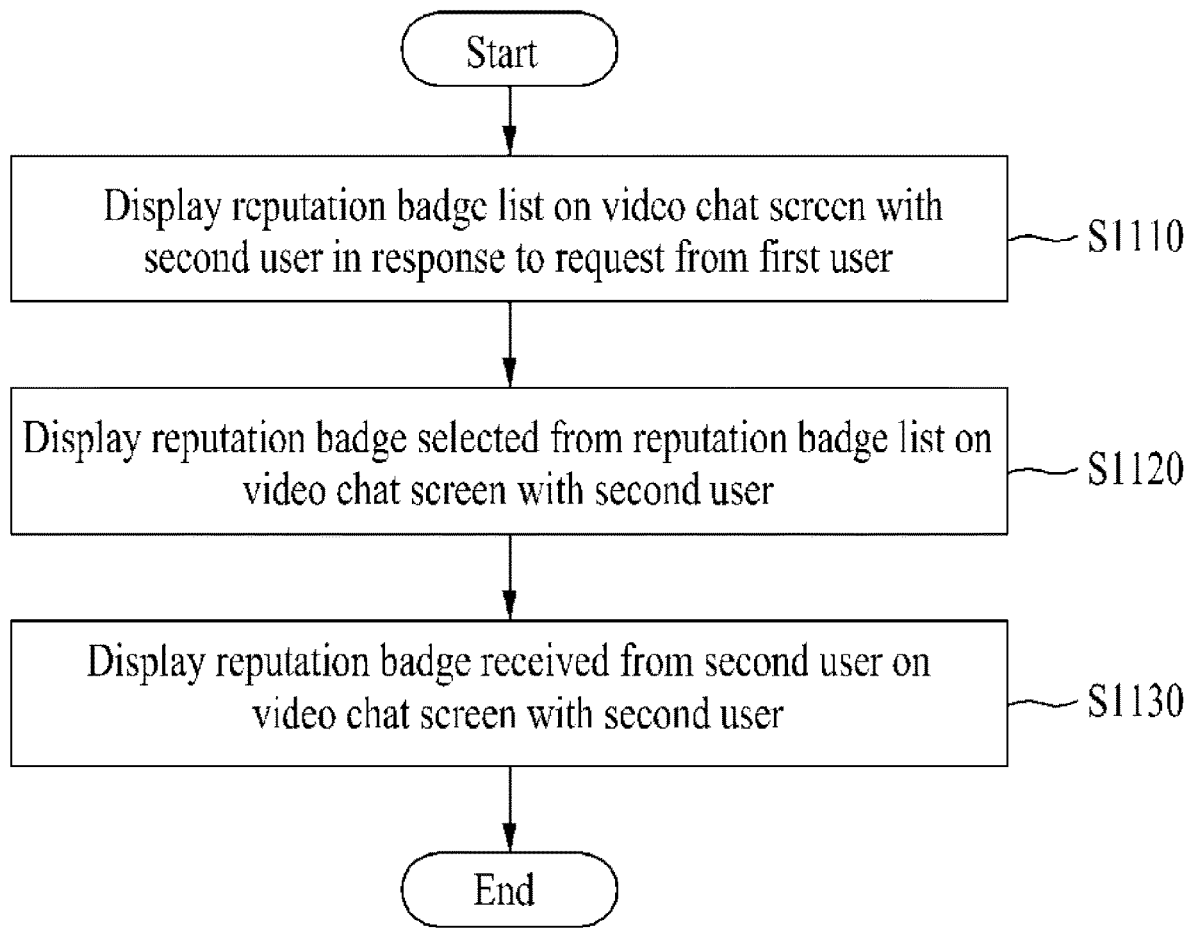
FIG. 11 is a flowchart illustrating an example of a reputation badge providing method performed by an electronic device according to at least one example embodiment.

FIG. 11 is a flowchart illustrating another example of a method performed by an electronic device according to at least one example embodiment.

Referring to FIG. 11, in operation S1110, the badge display 340 may display a reputation badge list on a video chat screen with a second user in response to a request from a first user. The first user may call the reputation badge list to represent an image of a counterpart as a reputation badge during a video chat. The first user may select one of the reputation badges from the reputation badge list.

In S1120, the badge display 340 may transfer the reputation badge selected from the reputation badge list to the electronic device 120 of the second user through the server 150 and may display the reputation badge on the video chat screen with the second user during a desired period of time.

In operation S1130, in response to receiving a reputation badge from the electronic device 120 of the second user, the badge display 340 may display the received reputation badge on the video chat screen with the second user during the desired period of time.

The reputation badge may have a limited number of transmissions per matching for the video chat. For example, the number of transmissions may be limited to once for each type of reputation badge per matching. Also, a number of times that a single user may transmit a reputation badge during a unit time, for example, 1 day may be limited.

In the example embodiment, an image of a counterpart may be represented as a reputation badge during a video chat. Through this, it is possible to provide user experience of collecting a reputation badge from a video chat counterpart.

Figure 12:
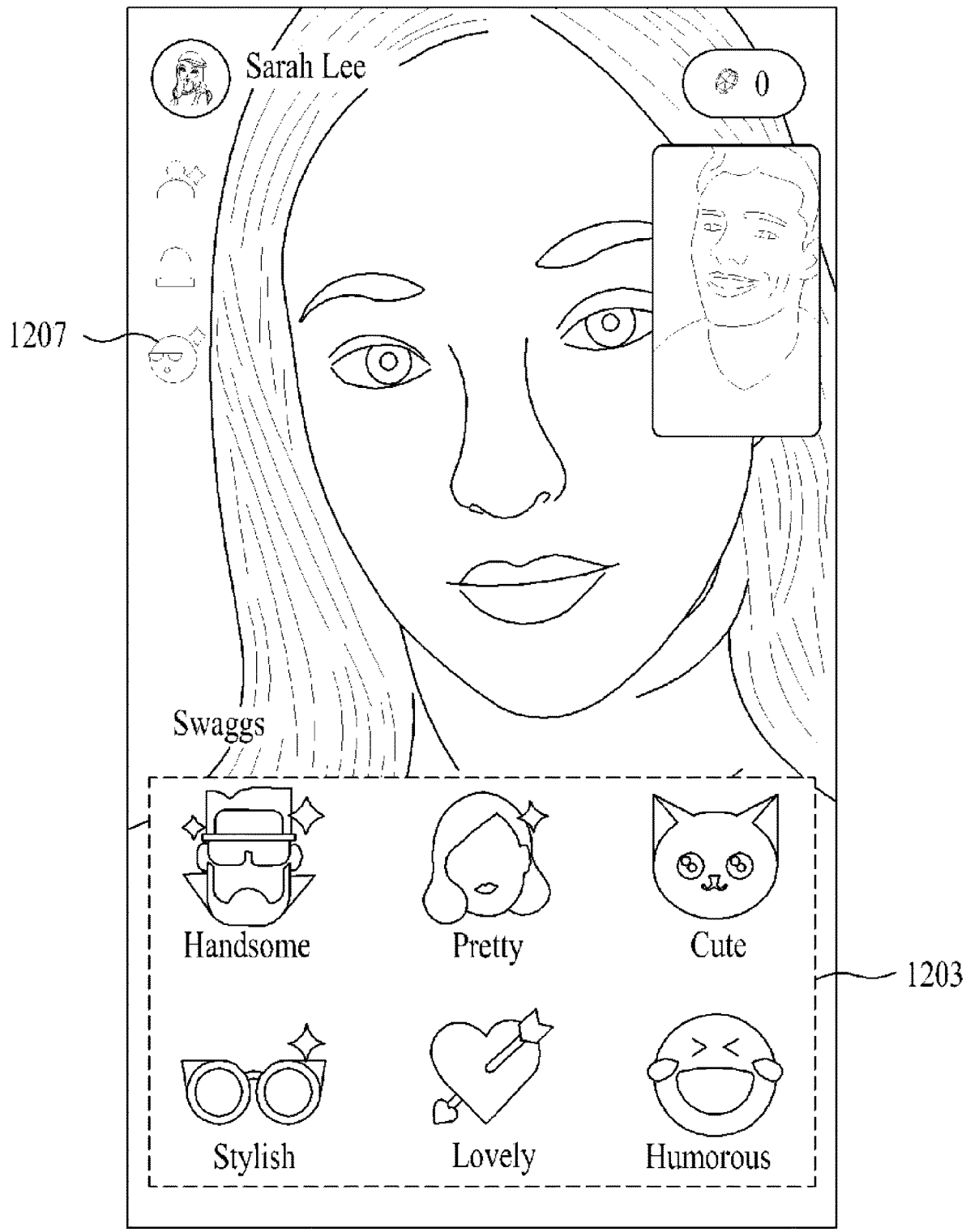
FIGS. 12 to 14 illustrate examples of describing a process of providing a reputation badge during a video chat according to at least one example embodiment.
Figure 13:
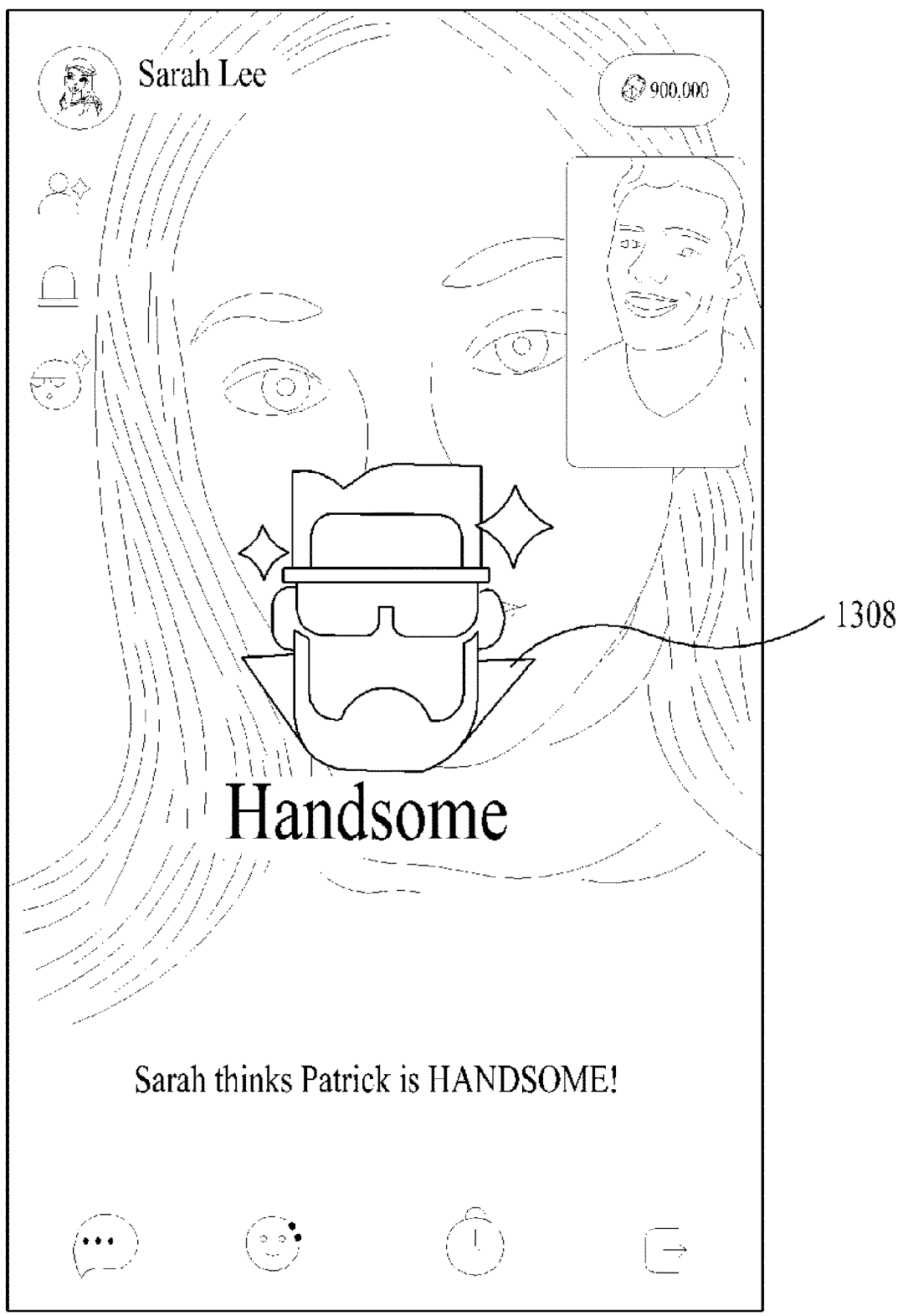
Figure 14:
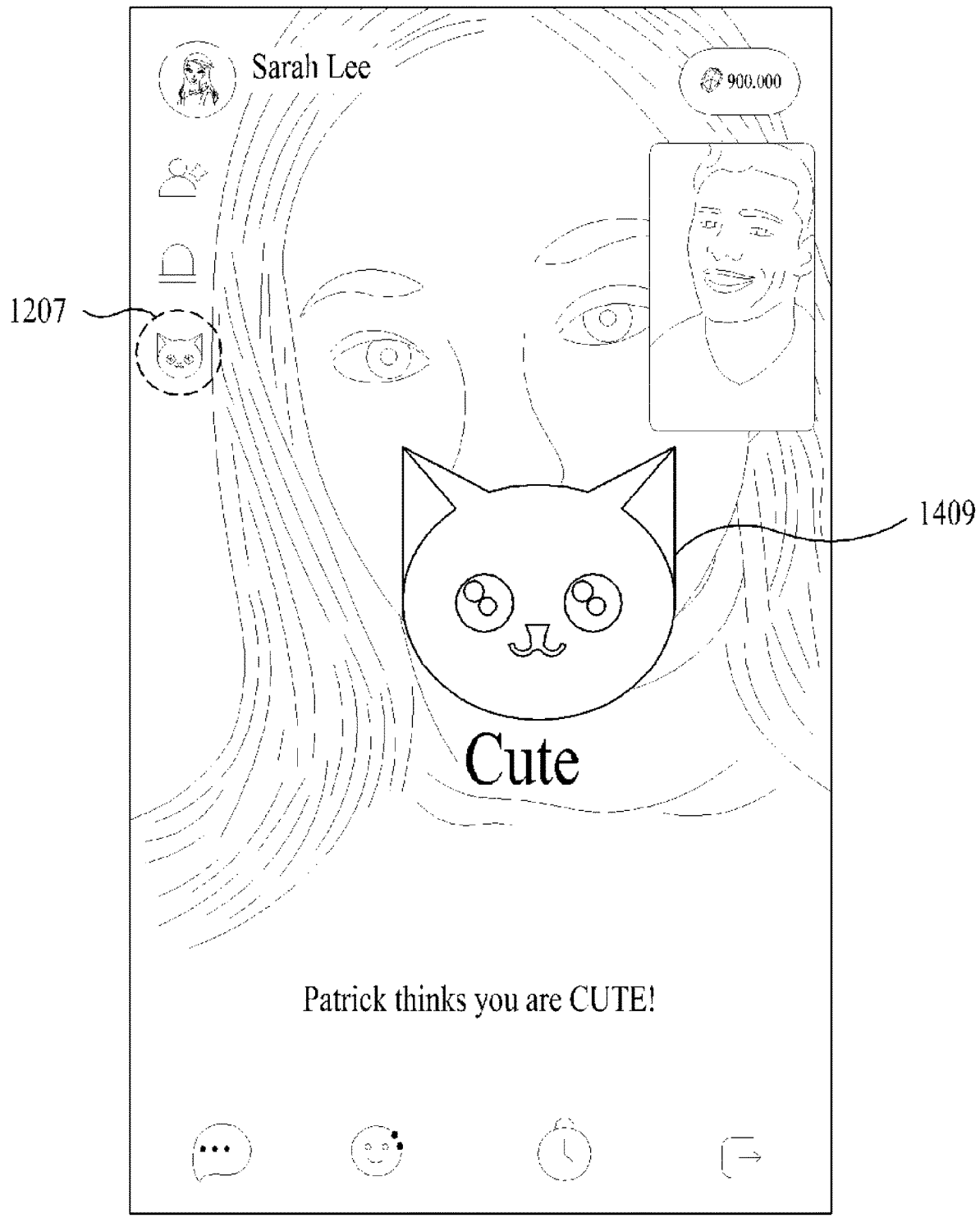

FIGS. 12 to 14 illustrate examples of describing a process of exchanging a reputation badge between a first user and a second user according to at least one example embodiment.

Referring to FIG. 12, the video chat screen 920 may include a badge call UI element 1207 for calling a reputation badge list. Here, an icon of the badge call UI element 1207 may be displayed as a default image.

Referring to FIG. 12, in response to an input from the first user on the badge call UI element 1207 during the video chat with the second user, the badge display 340 may display a reputation badge list 1203 on the video chat screen 920.

The reputation badge list 1203 may include badges representing different types of reputation information and may be sorted based on a preset condition and thereby displayed. For example, the reputation badge list 1203 may be sorted in descending order of a number of transmissions by the first user, a user group (e.g., a user group having similar profile information, a user group having a friend relationship set with the first user) associated with the first user, and the entire users using a friend finding service.

Referring to FIG. 13, when the first user selects a single reputation badge from the reputation badge list 1203 as an image of the second user, the badge display 340 may process the reputation badge list 1203 to be occluded and, at the same time, may display a reputation badge 1308 selected by the first user on the video chat screen 920 during a preset period of time. The electronic device 120 of the second user may also display the reputation badge 1308 selected by the first user as the image of the second user on the video chat screen with the first user.

If the first user again selects the same reputation badge as the reputation badge already selected as the image of the second user during the video call session, the badge display 340 may restrict the duplicate selection on the same badge and may display a duplicate selection notification message.

Referring to FIG. 14, if the second user selects and transmits a reputation badge (a first reputation badge) as an image of the first user during a video chat with the first user, the badge display 340 may display a first reputation badge 1409 received from the electronic device 120 of the second user on the video chat screen 920 with the second user.

In addition, in the case of receiving a first reputation badge 1409 from a counterpart, that is, the second user, the badge display 340 may display the icon of the badge call UI element 1207 as an image corresponding to the received first reputation badge 1409.

In response to newly receiving a reputation badge (a second reputation badge) of a different type from that of the first reputation badge 1409 from the second user, the badge display 340 may display the newly received second reputation badge on the video chat screen 920 with the second user instead of displaying the first reputation badge 1409 and may replace the icon of the badge call UI element 1207 with the image corresponding to the newly received second reputation badge and display the replaced image. That is, if a plurality of reputation badges is received from the second user, the badge display 340 may update reputation information of the second user about the first user with a most recently received reputation badge and thereby display the same.

Therefore, the processor 212 may allow the first user and the second user to exchange reputation badges using mutual images or a degree of good feeling during the video call session and may display the exchanged reputation badges on the video chat screen during a preset period of time.

Figure 15:
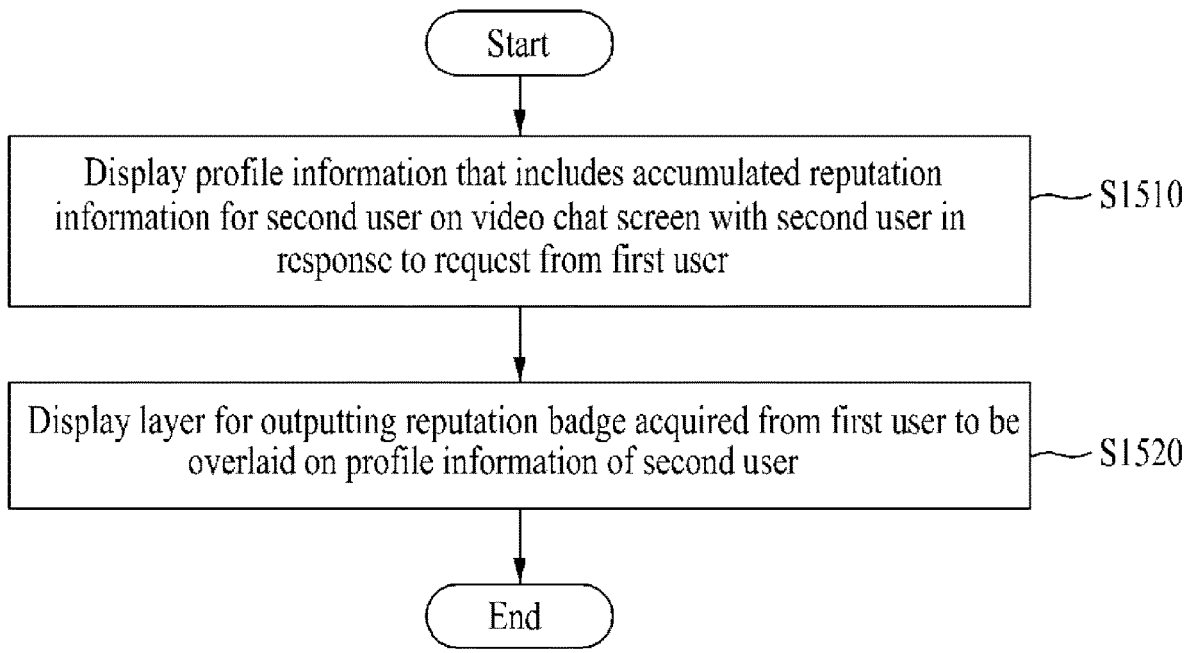
FIG. 15 is a flowchart illustrating an example of a profile providing method performed by an electronic device according to at least one example embodiment.

FIG. 15 is a flowchart illustrating another example of a method performed by an electronic device according to at least one example embodiment.

Referring to FIG. 15, in operation S1510, in response to a request from a first user during a video chat with a second user, the profile provider 350 may display a profile screen that includes profile information of the second user on a video chat screen with the second user. The profile information of the second user may include reputation information acquired while the second user is using a friend finding service. The server 150 may manage reputation information (e.g., a cumulative count for each type of reputation badge) acquired from a counterpart and profile information during a video chat with respect to each user using the friend finding service. The profile provider 350 may display, on a video chat screen with the second user, profile information that includes reputation information of a counterpart, that is, the second user during the video chat in response to a request from the first user.

In operation S1520, the profile provider 350 may display a layer for outputting a reputation badge acquired from the first user among reputation badges acquired by the second user to be overlaid on a corresponding profile screen while the profile screen including profile information of the second user is maintained to be displayed.

FIGS. 16 and 17 illustrate examples of describing a process of providing profile information of a counterpart according to at least one example embodiment.

Referring to FIG. 16, a profile UI element 1611 for verifying profile information of a counterpart having a video chat may be included in the video chat screen 920. In response to an input of the profile UI element 1611 during a video chat between the first user and the second user, the profile provider 350 may display a profile screen 1630 on the video chat screen 920.

Referring to FIG. 16, reputation information 1631 of a counterpart, that is, the second user having a video chat may be included on the profile screen 1630. Here, the reputation information 1631 may include a reputation badge list acquired by the second user and a cumulative count for each type of reputation badge. The reputation badge list included in the reputation information 1631 may be sorted in descending order of a cumulative count. If a reputation badge has not been acquired by the second user, the reputation information 1631 may not be displayed on the profile screen 1630.

Referring to FIG. 17, in response to elapse of a preset period of time after the profile screen 1630 is displayed on the video chat screen 920, the profile provider 350 may display a layer for outputting a reputation badge 1712 acquired from the first user among reputation badges acquired by the second user to be overlaid on the profile screen 1630. Various effects about an output form of the reputation badge 1712 may apply to the layer. For example, an animation effect that the reputation badge 1712 acquired from the first user rises from bottom to top may apply.

The reputation badge 1712 acquired from the first user may include a reputation badge transmitted from the first user to the second user for a current video call session only or may include reputation badges accumulated by transmitting from the first user to the second user from a previous video call session to the present time. More than one reputation badge may be displayed on the layer for outputting the reputation badge 1712. For example, if the first user has transmitted two reputation badges to the second user then two reputation badges may be displayed on the layer.

Therefore, the first user may verify at a glance one or more reputation badges expressed by the first user for the second user through the profile screen 1630 of the second user.

In response to a request from the first user, the processor 212 may provide reputation information, for example, the reputation badge list and a cumulative count for each type of reputation badge, acquired by the first user from a video chat counterpart through a management screen, for example, a profile screen, associated with the first user.

Figure 18:
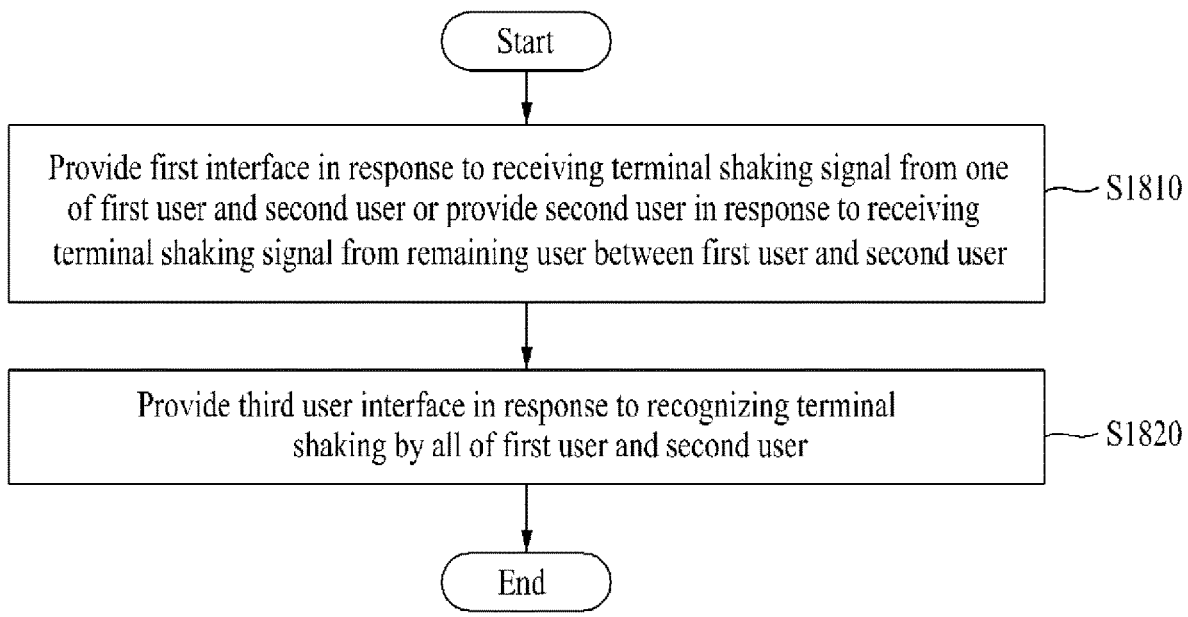
FIG. 18 is a flowchart illustrating an example of a good feeling indication method performed by an electronic device according to at least one example embodiment.

FIG. 18 is a flowchart illustrating another example of a method performed by an electronic device according to at least one example embodiment.

Referring to FIG. 18, in operation S1810, the interface provider 360 may provide a first interface in response to receiving a terminal shaking signal from one of a first user and a second user or may provide a second interface different from the first interface in response to receiving a terminal shaking signal from a remaining user between the first user and the second user, during a video chat between the first user and the second user. For example, the electronic device 110 and the electronic device 120 may each include a sensor to sense shaking of the electronic device, such as an accelerometer sensor or a gyro sensor. The electronic device 110 may transfer the terminal shaking signal to the electronic device 120 of the second user through the server 150, in response to recognizing a gesture that the first user shakes the electronic device 110 during the video chat. The electronic device 120 may transfer the terminal shaking signal to the electronic device 110 of the first user through the server 150, in response to recognizing a gesture that the second user shakes the electronic device 120 during the video chat.

For example, the interface provider 360 may provide the first interface in response to recognizing a terminal shaking signal according to a shake gesture that the first user shakes the electronic device 110, and may provide the second interface in response to recognizing a terminal shaking signal according to a shake gesture that the second user shakes the electronic device 120. That is, the interface provider 360 may provide the first interface in response to terminal shaking of a corresponding user and may provide the second interface in response to terminal shaking of a counterpart user. As another example, the interface provider 360 may provide the first interface in response to recognizing a first terminal shaking signal and may provide the second interface in response to recognizing a second terminal shaking signal as a response to the first terminal shaking signal, during a video chat between the first user and the second user. That is, the interface provider 360 may provide the first interface in response to an initial terminal shaking signal and may provide the second interface in response to a subsequent terminal shaking signal according to shaking order, regardless of the first user and the second user.

In operation S1820, the interface provider 360 may provide a third interface different from the first interface and the second interface in response to recognizing terminal shaking by all of the users of the video chat, for example, shaking by each of the first user and the second user during the video chat between the first user and the second user. The interface provider 360 may provide the third interface in response to terminal shaking by all of the first user and the second user during the video chat between the first user and the second user.

Figure 19:
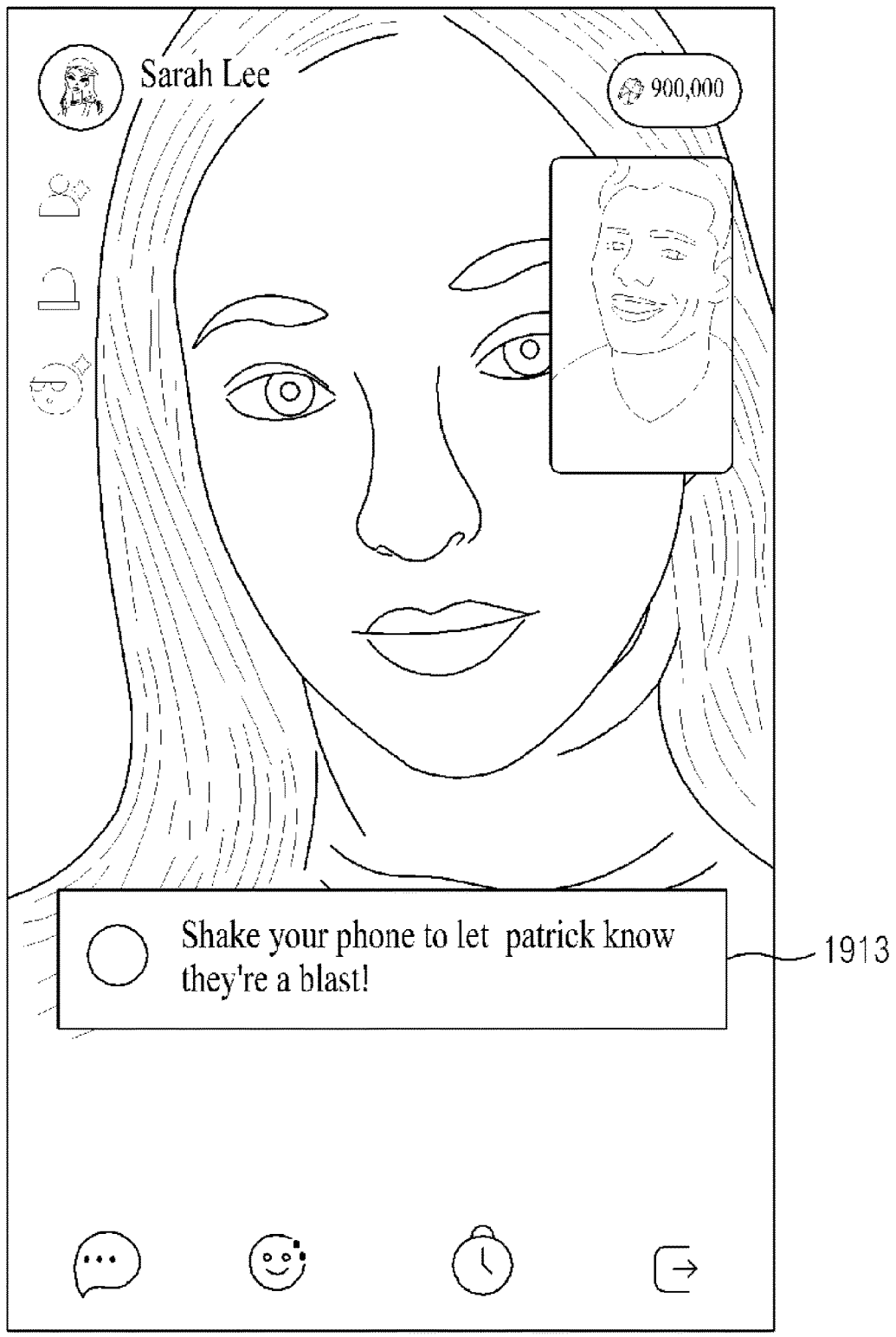

FIGS. 19 and 20 illustrate examples of describing a process of providing an interface according to terminal shaking according to at least one example embodiment.

Referring to FIG. 19, if a preset period of time elapses after a video chat between the first user and the second user starts, the interface provider 360 may display a message 1913 proposing to express a good feeling on the video chat screen 920.

According to the example embodiment, it is possible to express a good feeling for a counterpart by shaking a terminal during a video chat and to display, on a video chat screen, an interface representing that the good feeling has been expressed.

The interface of representing a good feeling refers to a feedback interface for terminal shaking and may be configured as various feedback types of interfaces, such as a visual element, an auditory element, and a tactile element. An interface configured using a visual element may include a layer having a predetermined (or, alternatively, desired) effect and may be displayed to be overlaid on the video chat screen 920.

For example, the interface provider 360 may provide an interface having the effect in which particles pour on the video chat screen as an interface of a visual element with respect to terminal shaking. Referring to FIG. 20, the interface provider 360 may display a first interface 2041 of animated particles pouring from left to right to be overlaid on the video chat screen 920 in response to the first user shaking the electronic device 110. Also, in response to receiving a terminal shaking signal from the electronic device 120 by an action of the counterpart, that is, the second user shaking the electronic device 120, the interface provider 360 may display a second interface 2042 of animated particles pouring from right to left to be overlaid on the video chat screen 920. In response to all of the first user and the second user shaking the electronic devices 110 and 120, the interface provider 360 may display a third interface 2043 of animated star-shaped particles pouring downward from top, that is, in a vertical direction to be overlaid on the video chat screen 920.

Therefore, the shaking between the first user and the second user may be divided into three stages, for example, shaking of a corresponding user, shaking of a corresponding counterpart, and mutual shaking, and the processor 212 control different interfaces to be distinguishably displayed for each stage.

The first interface 2041, the second interface 2042, and the third interface 2043 may be differently classified using animation using particles in different shapes and different layer colors. For example, the first interface 2041 may be configured as a blue layer, the second interface 2042 may be configured as a red layer, and the third interface 2043 may be configured as a pink layer.

A terminal shaking count for expressing a good feeling may be limited to a predetermined (or, alternatively, desired) number of times, for example, once, for each user per match. Here, the terminal shaking count may be limited for the purpose of blocking abusing without interfering with the video chat. The interface provider 360 may display a notification message (e.g., "You can no longer shake") related to shaking restriction immediately after the third interface is provided, after a preset period of time elapses, or while the third interface is provided.

Therefore, the example embodiment may express a good feeling between the first user and the second user using, for example, terminal shaking in addition to a reputation badge during a video chat.

In response to recognizing a terminal shaking signal by the first user or in response to recognizing a terminal shaking signal by the second user, the processor 212 may transfer information about the second user to the server 150 as good feeling expression information associated with the first user. The server 150 may store and maintain counterpart information according to terminal shaking for each user. Here, the counterpart information may include a counterpart for which a user expresses a good feeling through terminal shaking and a counterpart that expresses a good feeling for the user through terminal shaking. The counterpart information related to expression of a good feeling through terminal shaking may be used to determine a good feeling expression frequency of the user or a user preference. For example, how frequently the first user expresses a good feeling for another user through terminal shaking and how frequently the other user expresses a good feeling for the first user may be verified based on counterpart information of the counterpart for which the first user expresses a good feeling through terminal shaking and counterpart information of the counterpart that expresses a good feeling for the first user through terminal shaking. Also, a profile or a reputation of the counterpart for which the first user generally expresses a good feeling and a profile or reputation of the counterpart that expresses a good feeling for the first user may be verified based on counterpart information of the counterpart for which the first user expresses a good feeling through terminal shaking and counterpart information of the counterpart that expresses a good feeling for the first user through terminal shaking. Determination results about the good feeling expression frequency or the user preference may be used for friend matching.

Although the described example embodiments relate to the user expressing a good feeling through terminal shaking, example embodiments are not limited thereto and a user may express the good feeling through other methods. In addition to shaking a terminal, a good feeling between users may be expressed by performing a gesture or a motion predetermined by a user. For example, the user may perform a multi-swipe that is a gesture of pushing two fingers in a predetermined (or, alternatively, desired) direction on an I/O interface for expressing a good feeling. Here, the good feeling may be determined to be expressed in such a manner that each terminal recognizes the corresponding multi-swipe. For example, a first interface may be provided in response to detecting expression of a good feeling by the first user, a second interface may be provided in response to detecting expression of a good feeling by the second user, and a third interface may be provided in response to detecting expression of a good feeling by both sides.

According to some example embodiments, it is possible to provide a reputation badge available as a good feeling expression and a fun factor during a video chat. Also, according to some example embodiments, it is possible to provide content according to a preset condition during a matching wait time state for a video chat or to provide a preview of a front camera. Also, according to some example embodiments, it is possible to recommend a friend through matching between users based on a type of a reputation badge selected by a user. Also, according to some example embodiments, it is possible to display a reputation badge selected by a user during a video chat on a chat screen during a preset period of time. Also, according to some example embodiments, it is possible to provide user profile information that includes reputation badge information updated according to a video chat.

The systems or the apparatuses described herein may be implemented using hardware components, software components, and/or a combination thereof. For example, a processing device may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may be embodied permanently or temporarily in any type of machine, component, physical equipment, computer record medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable record mediums.

The methods according to the above-described example embodiments may be configured in a form of program instructions performed through various computer devices and recorded in non-transitory computer-readable media. The media may also include, alone or in combination with the program instructions, data files, data structures, and the like. The media may continuously store computer-executable programs or may temporarily store the same for execution or download. Also, the media may be various types of recording devices or storage devices in a form in which one or a plurality of hardware components are combined. Without being limited to media directly connected to a computer system, the media may be distributed over the network. Examples of the media include magnetic media such as hard disks, floppy disks, and magnetic tapes; optical media such as CD-ROM and DVDs; magneto-optical media such as floptical disks; and hardware devices that are specially configured to store and perform program instructions, such as ROM, RAM, flash memory, and the like. Examples of other media may include recording media and storage media managed by Appstore that distributes applications or a site, a server, and the like that supplies and distributes other various types of software.

The foregoing embodiments are examples and are not to be construed as limiting. The present teaching can be readily applied to other types of apparatuses. Also, the description of example embodiments is intended to be illustrative, and not to limit the scope of the claims, and many alternatives, modifications, and variations will be apparent to those skilled in the art.

What is claimed is:

1. A method performed by a computer apparatus, the method comprising:
   providing a video chat with another user selected through real-time matching based on a matching request which includes a reputation badge selected by a user of the computer apparatus, and based on reputation information included in a profile of the other user; and
   using a plurality of reputation badges representing different reputation information in the video chat;
   determining an estimated matching wait time of the real-time matching; and
   selecting an additional video content to be played on a matching wait screen based on determining that a length of the additional video content is shorter than the estimated matching wait time.

2. The method of claim 1, wherein the using comprises:
   displaying a reputation badge list comprising the plurality of reputation badges on a video chat screen based on a reputation badge list request received from the user;
   transmitting an indication of a reputation badge selected by the user from the reputation badge list to a computer apparatus of the other user; and
   displaying the selected reputation badge on the video chat screen.

3. The method of claim 2, wherein the using comprises:
   receiving an indication of a single reputation badge from among the plurality of reputation badges from the computer apparatus of the other user; and
   displaying the received reputation badge on the video chat screen.

4. The method of claim 3, wherein the reputation badge list request is received from the user based on a user interaction with a badge list user interface element, and
   wherein the displaying the received reputation badge further comprises updating the badge list user interface element to include an icon corresponding to the single reputation badge.

5. The method of claim 2, wherein each of the plurality of reputation badges is selectable for the other user up to a threshold number of times during the providing of the video chat.

6. The method of claim 1, further comprising displaying a preview of a front camera of the computer apparatus on a matching wait screen displayed during a matching wait time that is temporally interposed between the request being received and a start of the video chat.

7. The method of claim 1, further comprising displaying the additional video content on athe matching wait screen during a matching wait time that is temporally interposed between the request being received and a start of the video chat.

8. The method of claim 1, further comprising:
   based on one or more of the plurality of reputation badges being selected by the user of the computer apparatus during the video chat, enabling the profile of the other user to be updated so that the real-time matching with the other user is performed based on the updated profile at a next matching process.

9. The method of claim 1, further comprising:
   displaying a reputation badge list comprising the plurality of reputation badges on the matching wait screen during a matching wait time that is temporally interposed between the request being received and a start of the video chat; and
   identifying the other user based on a type of a reputation badge selected by the user from the reputation badge list.

10. The method of claim 9, wherein the other user is selected from a user group of which a cumulative count for the type of the reputation badge selected by the user exceeds a threshold number based on cumulative reputation information of each user.

11. The method of claim 1, further comprising:
    displaying profile information comprising cumulative reputation information about the other user based on a profile information request received from the user.

12. The method of claim 11, wherein the displaying of the profile information comprises displaying a plurality of types of reputation badges acquired by the other user and a cumulative count for each of the plurality of types on a profile screen of the other user.

13. The method of claim 11, wherein the displaying of the profile information comprises displaying, over a profile screen of the other user, a layer indicating a reputation badge acquired by the other user.

14. A non-transitory computer-readable record medium storing instructions that, when executed by a processor of a computer apparatus, cause the computer apparatus to perform a method that includes:
    providing a video chat with another user selected through real-time matching based on a matching request which includes a reputation badge selected by a user of the computer apparatus, and based on reputation information included in a profile of the other user; and
    using a plurality of reputation badges representing different reputation information in the video chat;
    determining an estimated matching wait time of the real-time matching; and
    selecting an additional video content to be played on a matching wait screen based on determining that a length of the additional video content is shorter than the estimated matching wait time.

15. A computer apparatus comprising:
    at least one processor configured to execute computer-readable instructions stored in a memory to:
    generate a video chat session between a user of the computer apparatus and an electronic device of another user selected through real-time matching and provide a video chat with the other user based on a matching request which includes a reputation badge selected by the user of the computer apparatus and based on reputation information included in a profile of the other user during the video chat session;

control at least one of a plurality of reputation badges representing different reputation information to be displayed on a video chat screen with the other user; and determine an estimated matching wait time of the real-time matching; and select an additional video content to be played on a matching wait screen based on determining that a length of the additional video content is shorter than the estimated matching wait time.

16. The computer apparatus of claim 15, wherein the at least one processor is further configured to execute computer-readable instructions stored in the memory to:

control a reputation badge list comprising the plurality of reputation badges to be displayed on the video chat screen based on a reputation badge list request received from the user according to a user interaction with a badge list user interface element, control an indication of a reputation badge selected by the user from the reputation badge list to be transmitted to the electronic device of the other user, control the selected reputation badge to be displayed on the video chat screen, control, based on an indication of a single reputation badge from among the plurality of reputation badges being received from the electronic device of the other user, the received reputation badge to be displayed on the video chat screen, and update the badge list user interface element to include an image corresponding to the single reputation badge.

17. The computer apparatus of claim 15, wherein the at least one processor is further configured to execute computer-readable instructions stored in the memory to control a preview of a front camera of the computer to be displayed on the matching wait screen during a matching wait time that is temporally interposed between the request being received and a start of the video chat.

18. The computer apparatus of claim 17, wherein the at least one processor is further configured to:

display the additional video content on the matching wait screen based on the estimated matching wait time exceeding a preset period of time.

19. The computer apparatus of claim 15, wherein the at least one processor is further configured to execute computer-readable instructions stored in the memory to:

control a reputation badge list comprising the plurality of reputation badges to be displayed on the matching wait screen during a matching wait time that is temporally interposed between the request being received and a start of the video chat based on the request, and identify the other user based on a type of a reputation badge selected by the user from the reputation badge list.

20. The computer apparatus of claim 15, wherein the at least one processor is further configured to execute computer-readable instructions stored in the memory to:

control profile information comprising cumulative reputation information about the other user to be displayed on the video chat screen based on a profile information request from the user, identify a cumulative count for each of a plurality of types of reputation badges to be displayed on a profile screen of the other user, and control a layer indicating a reputation badge acquired by the other user to be displayed over the profile screen of the other user.

* * * * *